United States Patent
Jin et al.

(10) Patent No.: US 12,535,981 B2
(45) Date of Patent: Jan. 27, 2026

(54) ELECTRONIC DEVICE, METHOD, AND STORAGE MEDIUM FOR CHANGING DISPLAY MODE OF DISPLAY

(71) Applicant: SAMSUNG ELECTRONICS CO., LTD., Suwon-si (KR)

(72) Inventors: Seoyoung Jin, Suwon-si (KR); Jeonggwan Kang, Suwon-si (KR); Sungyup Kim, Suwon-si (KR); Jongjin Kim, Suwon-si (KR); Byungwoo Min, Suwon-si (KR); Changhyun Sung, Suwon-si (KR); Jeongwon Yang, Suwon-si (KR); Mijung Park, Suwon-si (KR); Jeongmin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/645,094

(22) Filed: Apr. 24, 2024

(65) Prior Publication Data
US 2025/0021289 A1 Jan. 16, 2025

Related U.S. Application Data

(63) Continuation of application No. PCT/KR2024/004935, filed on Apr. 12, 2024.

(30) Foreign Application Priority Data

Jul. 14, 2023 (KR) .................. 10-2023-0092082
Jul. 20, 2023 (KR) .................. 10-2023-0094908

(51) Int. Cl.
*G06F 3/14* (2006.01)
*G06F 1/16* (2006.01)

(52) U.S. Cl.
CPC .......... *G06F 3/1423* (2013.01); *G06F 1/1641* (2013.01); *G06F 1/1652* (2013.01)

(58) Field of Classification Search
CPC .... G06F 3/1423; G06F 1/1641; G06F 1/1654; G06F 1/1677; G06F 1/1694
See application file for complete search history.

(56) References Cited

U.S. PATENT DOCUMENTS 9,830,075 B2 11/2017 Kim et al.
11,587,494 B2 2/2023 Skurniak
(Continued)

FOREIGN PATENT DOCUMENTS

KR 10-2020-0091522 A 7/2020
KR 10-2022-0017078 A 2/2022
(Continued)

OTHER PUBLICATIONS

International Search Report (PCT/ISA/210) issued by the International Searching Authority on Aug. 12, 2024 in International Application No. PCT/KR2024/004935.
(Continued)

*Primary Examiner* — Sanghyuk Park
(74) *Attorney, Agent, or Firm* — Sughrue Mion, PLLC

(57) ABSTRACT

An electronic device includes: a first housing including a first surface and a second surface opposite to the first surface; a second housing including a third surface and a fourth surface opposite to the third surface; a first display on the first and third surfaces; a second display on the second surface; a first inertial sensor in the first housing; a second inertial sensor in the second housing; and at least one processor. The at least one processor is configured to: identify, using the first and second inertial sensors, that an angle between a first direction in which the first surface faces and a second direction in which the third surface faces is (Continued)

within a designated range, identify that first data, which is related to a posture of the electronic device and is identified using the second inertial sensor, is within a first range, and change a display mode of the second display.

20 Claims, 16 Drawing Sheets

(56) References Cited

U.S. PATENT DOCUMENTS

| | | | |
|---|---|---|---|
| 12,014,104 B2 | 6/2024 | Jin et al. | |
| 2016/0042714 A1* | 2/2016 | Chang | G09G 5/026 |
| | | | 345/156 |
| 2018/0061374 A1* | 3/2018 | Wygonik | G09G 5/26 |
| 2021/0041912 A1* | 2/2021 | Eom | G06F 1/1677 |
| 2022/0066724 A1 | 3/2022 | Moon et al. | |
| 2022/0197584 A1* | 6/2022 | Zheng | G09G 3/035 |
| 2022/0215815 A1* | 7/2022 | Kim | G09G 5/14 |
| 2023/0152862 A1 | 5/2023 | Choi et al. | |
| 2023/0176803 A1 | 6/2023 | Jin et al. | |
| 2024/0012451 A1 | 1/2024 | Zhang et al. | |
| 2024/0125596 A1* | 4/2024 | Zhang | H04M 1/0214 |

FOREIGN PATENT DOCUMENTS

| | | |
|---|---|---|
| KR | 10-2022-0017203 A | 2/2022 |
| KR | 10-2022-0083093 A | 6/2022 |
| KR | 10-2023-0038290 A | 3/2023 |

OTHER PUBLICATIONS

Written Opinion (PCT/ISA/237) issued by the International Searching Authority on Aug. 12, 2024 in International Application No. PCT/KR2024/004935.

* cited by examiner

ELECTRONIC DEVICE, METHOD, AND STORAGE MEDIUM FOR CHANGING DISPLAY MODE OF DISPLAY

CROSS-REFERENCE TO RELATED APPLICATIONS

This application is a by-pass continuation application of International Application No. PCT/KR2024/004935, filed on Apr. 12, 2024, which is based on and claims priority to Korean Patent Application Nos. 10-2023-0092082, filed on Jul. 14, 2023, and 10-2023-0094908, filed on Jul. 20, 2023, in the Korean Intellectual Property Office, the disclosures of which are incorporated by reference herein their entireties.

BACKGROUND

1. Field

The disclosure relates to an electronic device, a method, and a storage medium for changing a display mode of a display.

2. Description of Related Art

With the development of technology, electronic devices including a flexible display have been developed. For example, a flexible display in an electronic device may be foldable. The electronic device may display a screen divided along a folding axis.

The above-described information may be provided as related art for the purpose of helping to understand the disclosure. No claim or determination is raised as to whether any of the above-described information may be applied as prior art related to the disclosure.

SUMMARY

According to an aspect of the disclosure, an electronic device may comprise: a first housing including a first surface and a second surface opposite to the first surface, a second housing including a third surface and a fourth surface opposite to the third surface, a hinge foldably connecting the first housing and the second housing to each other along a folding axis, a first display on the first surface and the third surface, a second display on the second surface, a first inertial sensor in the first housing, a second inertial sensor in the second housing, and at least one processor operatively coupled to the first display, the second display, the first inertial sensor, and the second inertial sensor. The at least one processor may be configured to: identify, using the first inertial sensor and the second inertial sensor, that an angle between a first direction in which the first surface faces and a third direction in which the third surface faces is within a designated range, based on identifying that the angle between the first direction and the third direction is within the designated range, identify that first data, which is related to a posture of the electronic device and is identified using the second inertial sensor, is within a first range, and based on identifying that the first data is within the first range, change a display mode of the second display.

The at least one processor may be configured to, based on identifying that the first data is within the first range, change the display mode of the second display from a first display mode for displaying a first screen to a second display mode for displaying a second screen in which the first screen is rotated.

The at least one processor may be configured to: based on the display mode being changed, identify second data, which is related to the posture of the electronic device and is identified using the first inertial sensor, is out of a second range different from the first range, and based on identifying that the second data is out of the second range, change the display mode of the second display from the second display mode to the first display mode.

The at least one processor may be configured to: identify that a designated application is executed while displaying a screen using the second display based on the second display mode, based on identifying that the designated application is executed, identify a third display mode for the designated application, and based on identifying the third display mode, set the display mode of the second display to the third display mode.

The at least one processor may be configured to: based on identifying that the third display mode corresponds to the second display mode, set the display mode of the second display to the third display mode corresponding to the second display mode, and based on identifying that the third display mode is different from the second display mode, change the display mode of the second display from the second display mode to the third display mode.

The at least one processor may be configured to, while the first data is within the first range, based on identifying that the angle between the first direction and the third direction is out of the designated range, set the display mode of the second display to the first display mode.

The at least one processor may be configured to: identify that the angle between the first direction and the third direction is changed within the designated range, and based on identifying that the angle between the first direction and the third direction is changed within the designated range, deactivate the first display and activate the second display.

The at least one processor may be configured to identify that the first data, which is identified using the first inertial sensor, is within the first range while the third direction is opposite to a gravity direction.

The at least one processor may be configured to: set usage history information of the electronic device as an input value of a designated model indicated by a plurality of parameters, and based on an output value of the designated model, identify the first range.

The first data may comprise first acceleration data and first rotation data. The second data may comprise second acceleration data and second rotation data. The at least one processor may be configured to: based on identifying that a screen is displayed through at least one of the first display and the second display, identify, using the first data and the second data, the angle between the first direction and the third direction, and based on identifying that a screen is not displayed through the first display and the second display, identify, using the first acceleration data and the second acceleration data, the angle between the first direction and the third direction.

According to an aspect of the disclosure, a method of an electronic device including a first housing including a first surface and a second surface opposite to the first surface, a second housing including a third surface and a fourth surface opposite to the third surface, a first display on the first surface and the third surface, a second display on the second surface, a first inertial sensor, and a second inertial sensor, comprises: identifying, using the first inertial sensor and the second inertial sensor, that an angle between a first direction in which the first surface of a first housing faces and a third direction in which the third surface of a second housing faces is within a designated range, based on identifying that the angle between the first direction and the third direction is within the designated range, identifying that first data, which is related to a posture of the electronic device and is identified using the second inertial sensor, is within a first range, and based on identifying that the first data is within the first range, changing a display mode of the second display.

The method may comprise, based on identifying that the first data is within the first range, changing the display mode of the second display from a first display mode for displaying a first screen to a second display mode for displaying a second screen in which the first screen is rotated.

The method may comprise: based on the display mode being changed, identifying second data, which is related to the posture of the electronic device and is identified using the first inertial sensor, is out of a second range different from the first range, and based on identifying that the second data is out of the second range, changing the display mode of the second display from the second display mode to the first display mode.

The method may comprise: identifying that a designated application is executed while displaying a screen of the second display based on the second display mode, based on identifying that the designated application is executed, identifying a third display mode for the designated application, and based on identifying the third display mode, setting the display mode of the second display to the third display mode.

The method may comprise: based on identifying that the third display mode corresponds to the second display mode, setting the display mode of the second display to the third display mode corresponding to the second display mode, and based on identifying that the third display mode is different from the second display mode, changing the display mode of the second display from the second display mode to the third display mode.

The method may comprise, while the first data is within the first range, based on identifying that the angle between the first direction and the third direction is out of the designated range, setting the display mode of the second display to the first display mode.

The method may comprise: identifying that the angle between the first direction and the third direction is changed within the designated range, and based on identifying that the angle between the first direction and the third direction is changed within the designated range, deactivating the first display and activating the second display.

The method may further comprise identifying that the first data, which is identified using the first inertial sensor, is within the first range when the third direction is opposite to a gravity direction.

The method may comprise: setting usage history information of the electronic device as an input value of a designated model indicated by a plurality of parameters, and based on an output value of the designated model, identifying the first range.

According to an aspect of the disclosure, a non-transitory computer readable storage medium may store one or more programs. The one or more programs comprise instructions that when executed by at least one processor of an electronic device comprising a first housing including a first surface and a second surface opposite to the first surface, a second housing including a third surface and a fourth surface opposite to the third surface, a first display on the first surface and the third surface, a second display on the second surface, a first inertial sensor, and a second inertial sensor, cause the electronic device to: identify, using the first inertial sensor and the second inertial sensor, that an angle between a first direction in which the first surface faces and a third direction in which the third surface faces is within a designated range, based on identifying that the angle between the first direction and the third direction is within the designated range, identify that first data, which is related to a posture of the electronic device and is identified using the second inertial sensor, is within a first range, and based on identifying that the first data is within the first range, change a display mode of the second display.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
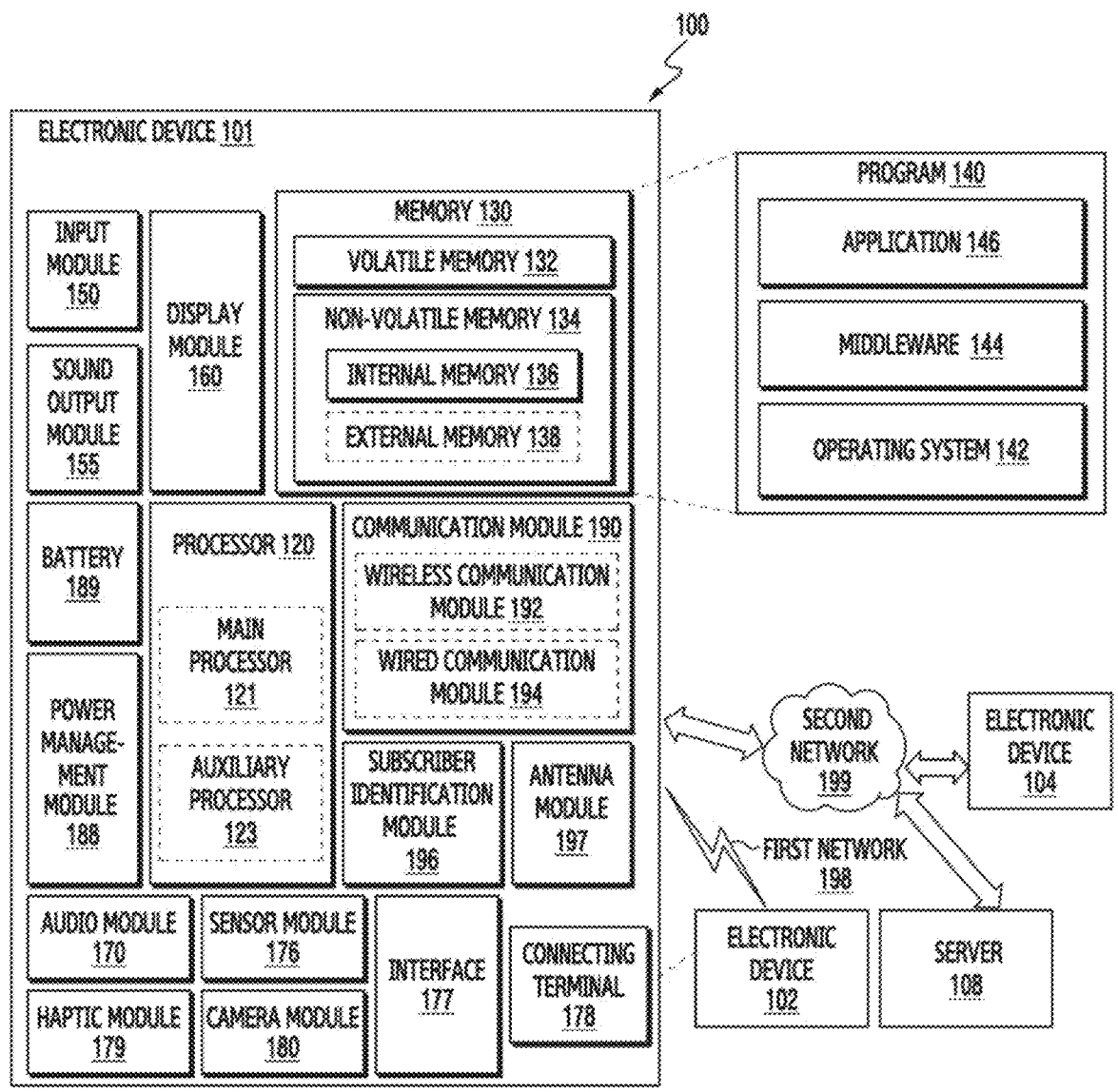
FIG. 1 is a block diagram of an electronic device in a network environment according to an embodiment.

Hereinafter, embodiments of the disclosure will be described in detail with reference to drawings so that those having ordinary knowledge in the art to which the disclosure belongs may easily implement it. However, the disclosure may be implemented in various different forms and is not limited to the embodiments described herein. In relation to the description of the drawings, identical or similar reference numerals may be used for identical or similar components. In addition, in the drawings and related descriptions, descriptions of well-known features and configurations may be omitted for clarity and brevity.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101.

The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
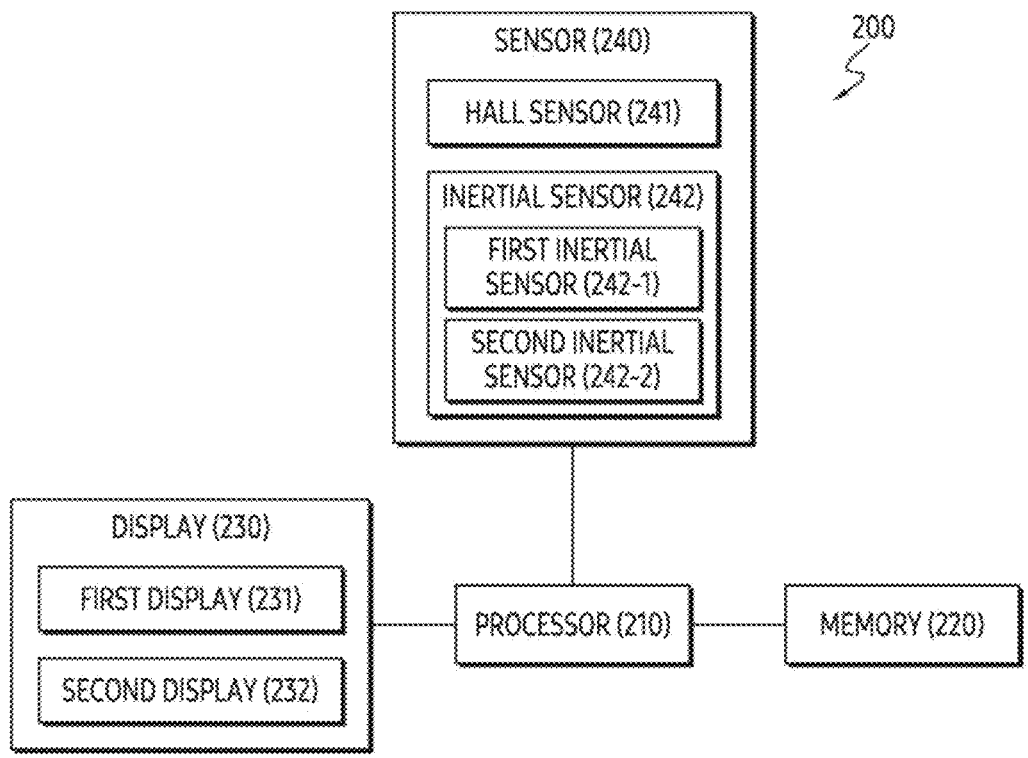
FIG. 2 illustrates an example of a simplified block diagram of an electronic device according to an embodiment.

FIG. 2 illustrates an example of a simplified block diagram of an electronic device according to an embodiment.

Referring to FIG. 2, an electronic device 200 may include some or all of the components of the electronic device 101 illustrated in FIG. 1. For example, the electronic device 200 may correspond to the electronic device 101 illustrated in FIG. 1.

According to an embodiment, the electronic device 200 may include a processor 210, a memory 220, a display 230, and/or a sensor 240. According to an embodiment, the electronic device 200 may include at least one of the processor 210, the memory 220, the display 230, and the sensor 240. For example, at least a part of the processor 210, the memory 220, the display 230, or the sensor 240 may be omitted according to an embodiment. In an embodiment, the electronic device 200 may include various components in addition to the processor 210, the memory 220, the display 230, and the sensor 240.

According to an embodiment, the electronic device 200 may include the processor 210. The processor 210 may be operably coupled with or connected with the memory 220, the display 230, and the sensor 240. The processor 210 being operably coupled with or connected with the memory 220, the display 230, and the sensor 240 may mean that the processor 210 may control the memory 220, the display 230, and the sensor 240.

For example, the processor 210 may control the memory 220, the display 230, and the sensor 240. the memory 220, the display 230, and the sensor 240 may be controlled by the processor 210. For example, the processor 210 may be configured with at least one processor. For example, the processor 210 may include at least one processor. For example, the processor 210 may correspond to the processor 120 of FIG. 1.

According to an embodiment, the processor 210 may include a hardware component for processing data based on one or more instructions. Hardware components for processing data may include, for example, an arithmetic and logic unit (ALU), a field programmable gate array (FPGA), and/or a central processing unit (CPU).

According to an embodiment, the electronic device 200 may include the memory 220. For example, the memory 220 may correspond to the memory 130 of FIG. 1. For example, the memory 220 may be a volatile memory unit or units. For example, the memory 220 may be a nonvolatile memory unit or units. For example, the memory 220 may be another type of computer-readable medium such as a magnetic or optical disk. For example, the memory 220 may store data obtained based on an operation performed in the processor 210 (e.g., an operation of performing an algorithm).

For example, the memory 220 may be used to store one or more programs. One or more programs may include instructions that, when executed by the processor 210 of the electronic device 200, cause the electronic device 200 to perform a defined operation.

For example, one or more instructions indicating a calculation and/or an operation to be performed by the processor 210 on data may be stored in the memory 220. A set of one or more instructions may be referred to as firmware, operating system, process, routine, sub-routine and/or application. For example, when a set of instructions distributed in the form of operating system, firmware, driver, and/or application are executed, the electronic device 200 and/or the processor 210 may perform at least one of operations of the electronic device 200 described later. Hereinafter, an application being installed in the electronic device 202 may mean that one or more instructions provided in the form of application are stored in the memory 220 of the electronic device 200, and that the one or more applications are stored in a format (e.g., a file with an extension specified by the operating system of the electronic device 200) executable by the processor 210 of the electronic device 200.

According to an embodiment, the electronic device 200 may include the display 230. For example, the display 230 may correspond to the display module 160 of FIG. 1.

For example, the display 230 of the electronic device 200 may output visualized information to the user. The display 230 may include a liquid crystal display (LCD), a plasma display panel (PDP), one or more light emitting diodes (LEDs), and/or one or more organic light emitting diodes (OLEDs). According to an embodiment, the display 230 may include a sensor (e.g., a touch sensor panel (TSP)) for detecting an external object (e.g., a user's finger) on the display 230. For example, based on the TSP, the electronic device 200 may detect an external object (e.g., a user's finger) contacting with the display 230 or floating on the display 230. Among visual objects (e.g., a plurality of icons for photographing) being displayed in the display 230, the electronic device 200 may execute a function related to a specific visual object corresponding to a portion of the display 230 to which the external object is in contact, in response to detecting the external object.

For example, the display 230 may include a first display 231 and a second display 232. The first display 231 may be deformed by an external force applied to the first display 231. For example, the first display 231 may be referred to as a flexible display. The second display 232 may be referred to as a cover display. A specific example of the first display 231 and the second display 232 disposed in the electronic device 200 will be described through FIGS. 3A and 3B.

According to an embodiment, the electronic device 200 may include the sensor 240. The sensor 240 of the electronic device 200 may generate electronic information capable of being processed by the processor 210 and/or the memory 220 from non-electronic information related to the electronic device 200. The electronic information generated by the sensor 240 may be stored in the memory 220, processed by the processor 210, or transmitted to another electronic device different from the electronic device 200. The sensors 240 may be one or more.

For example, the sensor 240 may include a hall sensor 241 for identifying an angle between housings included in the electronic device 200. The hall sensor 241 may include one or more magnets and/or one or more magnetic sensors. At least one of the one or more magnets or the one or more magnetic sensors included in the hall sensor 241 may be disposed at different positions in the electronic device 200. A positional relationship in the electronic device 200 of the one or more magnets and/or the one or more magnetic sensors may be changed according to a state (or shape) of the electronic device 200. The electronic device 200 may measure a change in the positional relationship through the one or more magnetic sensors. The change in the positional relationship may cause a change in a magnetic field formed by the one or more magnets. The electronic device 200 may obtain a power signal indicating the change in the magnetic field by using the hall sensor 241. For example, the electronic device 200 may distinguish a posture or a state (e.g., a folding state or an unfolding state) by using the power signal obtained from the hall sensor 241. For example, the electronic device 200 may receive data indicating a state of the electronic device 200 from the hall sensor 241. For example, the hall sensor 241 may output data indicating a shape of the first display 231. The shape of the first display 231 may be folded or changed as it is unfolded by a folding axis (e.g., the folding axis 337 to be described later in FIG. 3A). For example, the hall sensor 241 may output different data indicating the shape of the first display 231.

For example, the hall sensor 241 may include an analog hall sensor and/or a digital hall sensor. For example, the analog hall sensor may operate in an 'on' state when an identified magnetic force value is greater than or equal to a threshold value. The analog hall sensor may operate in an 'off' state when the identified magnetic force value is less than the threshold value. For example, the digital hall sensor may measure a magnetic force value in addition to the function of the analog hall sensor. A threshold value of the analog hall sensor is fixed, but a threshold value of the digital hall sensor may be changed.

According to an embodiment, the sensor 240 may include an inertial sensor 242. The inertial sensor 242 may include at least one of an acceleration sensor and/or a gyro sensor. For example, the acceleration sensor may identify (or measure or detect) acceleration of the electronic device 200 in three directions of x-axis, y-axis, and z-axis. For example, the gyro sensor may identify (or measure or detect) an angular velocity of the electronic device 200 in three directions of the x-axis, y-axis, and z-axis.

For example, the inertial sensor 242 may include a first inertial sensor 242-1 and a second inertial sensor 242-2. The first inertial sensor 242-1 may be disposed in a first housing (e.g., a first housing 310 of FIG. 3A) of the electronic device 200. The second inertial sensor 242-2 may be disposed in a second housing (e.g., a second housing 320 of FIG. 3A) of the electronic device 200. The first inertial sensor 242-1 may be used to set a display mode (e.g., a landscape mode and a portrait mode) of a display (e.g., the first display 231 and the second display 232) of the electronic device 200. The second inertial sensor 242-2 may be used together with the first inertial sensor 242-1 to identify an angle between the first housing and the second housing of the electronic device 200.

For example, the inertial sensor 242 may be used to identify a posture of the electronic device 200. The processor 210 of the electronic device 200 may identify a posture (or orientation) of the electronic device 200 by using the inertial sensor 242.

Figure 3A:
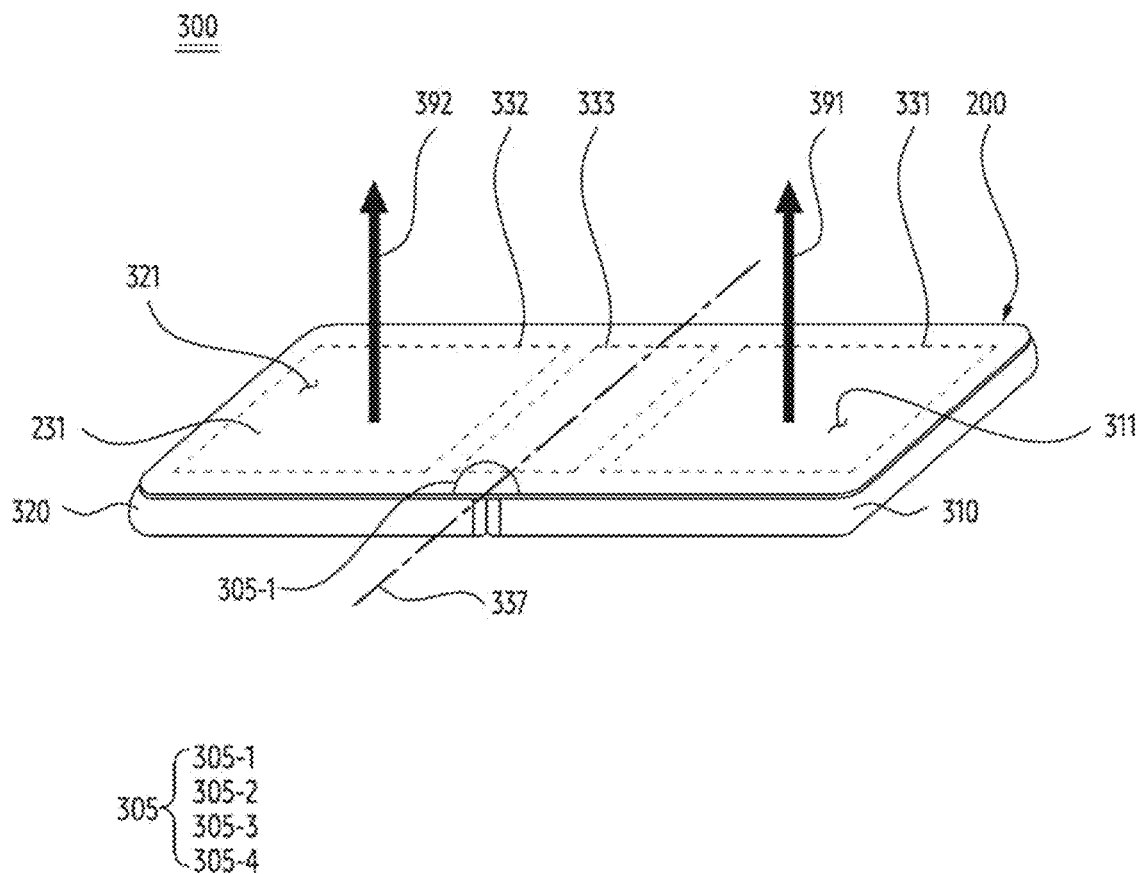
FIGS. 3A and 3B illustrate an example of a positional relationship between a first housing and a second housing within an unfolding state and a folding state of an electronic device according to an embodiment.
Figure 3B:
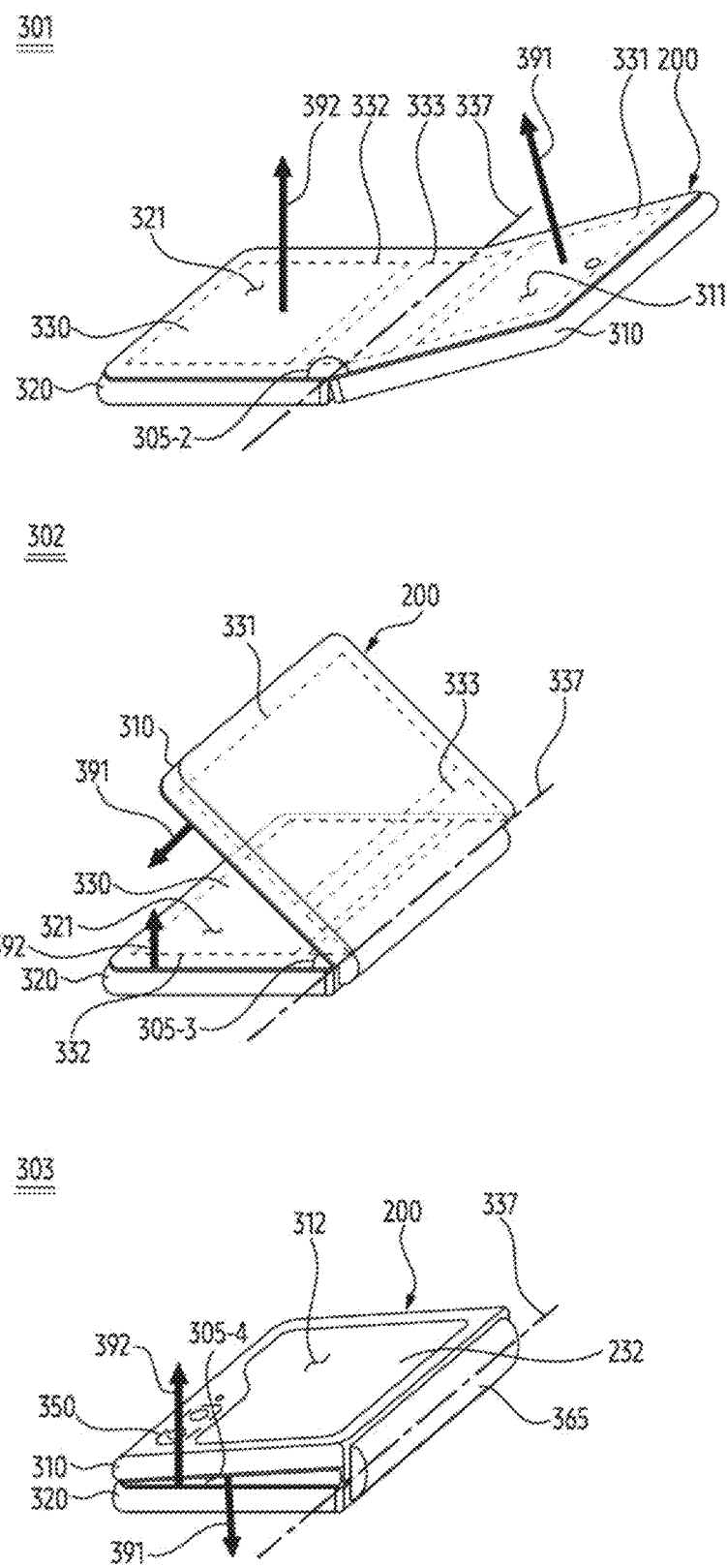

FIGS. 3A and 3B illustrate an example of a positional relationship between a first housing and a second housing within an unfolding state and a folding state of an electronic device according to an embodiment.

Referring to FIGS. 3A and 3B, an electronic device 200 may be an example of the electronic device 101 of FIG. 1. A first housing 310, a second housing 320, and a folding housing 365 may be included in the electronic device 200. The electronic device 200 may include the first housing 310 including a first surface 311 and a second surface 312 opposite to the first surface. The electronic device 200 may include the second housing 320 including a third surface 321 and a fourth surface opposite to the third surface 321. The electronic device 200 may include a folding housing 365 pivotably connecting the first housing 310 and the second housing 320. At least a portion of a first display 231 may be disposed on a surface (e.g., the first surface 311) of the first housing 310 and a surface (e.g., the third surface 321) of the second housing 320. For example, at least a portion of the first display 231 may be disposed on the first surface 311 and the third surface 321, across the folding housing 365. A first display area 331, a second display area 332, and a third display area 333 may be included in the first display 231. The folding housing 365 may include a hinge. A second display 232 may be disposed on the second surface 312. The electronic device 200 may include a camera facing a direction in which the second surface 312 faces. The camera may be disposed within a partial area 350 of the second surface 312.

The housing (e.g., the first housing 310, the second housing 320, and the folding housing 365) described above may be referred to as a housing part. For example, the first housing 310 may be referred to as a first housing part. For example, the second housing 320 may be referred to as a second housing part. For example, the folding housing 365 may be referred to as a folding housing part.

According to an embodiment, the electronic device 200 may provide an unfolding state in which the first housing 310 and the second housing 320 are fully unfolded out by the folding housing 365. For example, referring to FIG. 3A, the electronic device 200 may be in an unfolding state 300, which is the unfolding state. For example, the state 300 may mean a state in which a first direction 391 in which the first surface 311 faces corresponds to a second direction 392 in which the third surface 321 faces. For example, in the state 300, the first direction 391 may be substantially parallel to the second direction 392. For example, in the state 300, the first direction 391 may be substantially the same as the second direction 392.

According to an embodiment, in the state 300, the first surface 311 may form a substantially single plane with the third surface 321. For example, an angle 305-1 between the first surface 311 and the third surface 321 in the state 300 may be about 180 degrees. For example, the state 300 may mean a state in which the entire display area of the first display 231 may be substantially provided on a single plane. For example, the state 300 may mean a state in which all of the first display area 331, the second display area 332, and the third display area 333 may be provided on a single plane. For example, in the state 300, the third display area 333 may not include a curved surface. The unfolding state may be referred to as an outspread state (or an outspreading state). Hereinafter, a different state of the electronic device 200 based on angles 305-2, 305-3, and 305-4 will be described later.

Referring to FIG. 3B, according to an embodiment, the electronic device 200 may provide a folding state in which the first housing 310 and the second housing 320 are folded in by the folding housing 365. For example, the electronic device 200 may be in the folding state including a state 301, a state 302, and a state 303. For example, the folding state including the state 301, the state 302, and the state 303 may mean a state in which the first direction 391 in which the first surface 311 faces is distinguished from the second direction 392 in which the third surface 321 faces. For example, in the state 301, an angle between the first direction 391 and the second direction 392 is about 45 degrees, and the first direction 391 and the second direction 392 may be distinguished from each other. For example, in the state 302, the angle between the first direction 391 and the second direction 392 is about 150 degrees, and the first direction 391 and the second direction 392 may be distinguished from each other. For example, in the state 303, the angle between the first direction 391 and the second direction 392 is substantially 180 degrees, and the first direction 391 and the second direction 392 may be distinguished from each other.

According to an embodiment, an angle between the first surface 311 and the third surface 321 in the folding state may be about 0 degree or more and less than 180 degrees. For example, in the state 301, an angle 305-2 between the first surface 311 and the third surface 321 may be about 135 degrees. In the state 302, an angle 305-3 between the first surface 311 and the third surface 321 may be about 30 degrees. In the state 303, an angle 305-4 between the first surface 311 and the third surface 321 may be substantially 0 degree. For example, the folding state may be referred to as a folded state.

In an embodiment, the folding state may include a plurality of sub-folding states, unlike the unfolding state. For example, referring to FIG. 3B, the folding state may include the state 303, which is a fully folding state in which the first surface 311 is substantially overlapped on the third surface 321 by rotation provided through the folding housing 365 and the states 301 and 302, which is an intermediate folding state between the state 303 and the unfolding state (e.g., the state 300 of FIG. 3A) as the plurality of sub-folding states. For example, the electronic device 200 may provide the state 303 in which the entire area of the first display area 331 is substantially fully overlapped on the entire area of the second display area 332 as the first surface 311 and the third surface 321 face each other by the folding housing 365. For example, the electronic device 200 may provide the state 303 in which the first direction 391 is substantially opposite to the second direction 392. For example, the state 303 may mean a state in which the first display 231 is obscured within the field of view of the user looking the electronic device 200. However, embodiments of the disclosure are not limited thereto.

According to an embodiment, the first display 231 may be bent by rotation provided through the folding housing 365. For example, in the first display 231, the third display area 333 may be bent according to the folding operation, unlike the first display area 331 and the second display area 332. For example, the third display area 333 may be in a curvedly bent state to prevent damage to the first display 231 in the fully folding state. In the fully folding state, unlike the third display area 333 being curvedly bent, the entire first display area 331 may fully be overlapped on the entire second display area 332.

FIGS. 3A to 3B illustrate an example in which the first display 231 of the electronic device 200 includes one folding display area (e.g., the third display area 333) or the electronic device 200 includes one folding housing (e.g., the folding housing 365), but it is for convenience of explanation. According to an embodiment, the first display 231 of the electronic device 200 may include a plurality of folding display areas. For example, the first display 231 of the electronic device 200 may include two or more folding display areas, and the electronic device 200 may include two or more folding housings for providing the two or more folding areas, respectively.

Figure 4:
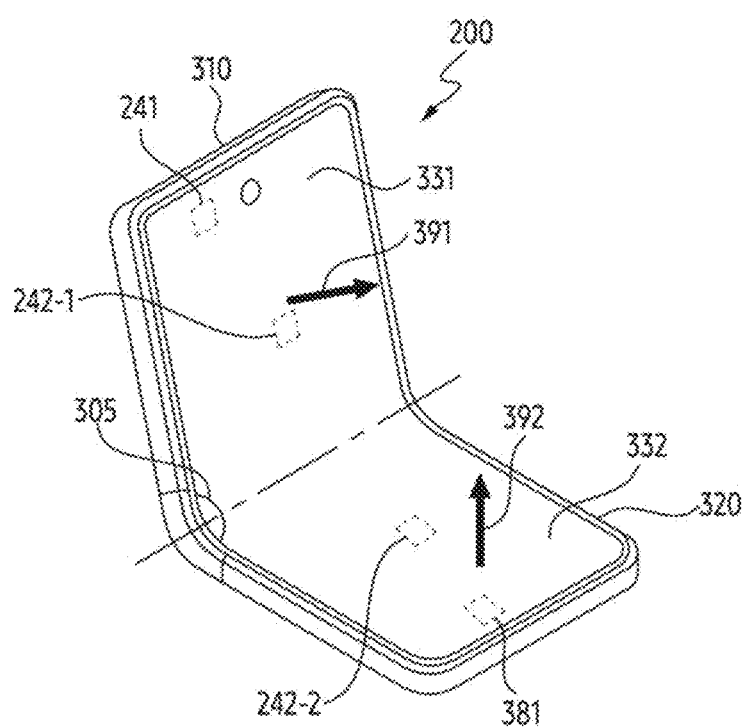
FIG. 4 illustrates an example of a plurality of states of an electronic device according to an embodiment.

FIG. 4 illustrates an example of a plurality of states of an electronic device according to an embodiment.

Referring to FIG. 4, an electronic device 200 may provide a plurality of states based on a positional relationship between a first housing 310 and a second housing 320. For example, the electronic device 200 may provide a plurality of states based on an angle 305 between a first display area 331 and a second display area 332. For example, the electronic device 200 may provide a plurality of states based on an angle between a first direction 391 in which the first surface 311 (or the first display area 331) faces and a second direction 392 in which the third surface 321 (or the second display area 332) faces.

According to an embodiment, the electronic device 200 may identify the angle 305 between the first display area 331 and the second display area 332. For example, the electronic device 200 may include a first inertial sensor 242-1 disposed in the first housing 310 and a second inertial sensor 242-2 disposed in the second housing 320. The processor 210 may identify the angle 305 based on first vector indicating a gravity direction identified using the first inertial sensor 242-1 and second vector indicating a gravity direction identified using the second inertial sensor 242-2.

According to an embodiment, the electronic device 200 may include a hall sensor 241. The electronic device 200 may include at least one magnet 381. The hall sensor 241 included in the electronic device 200 may obtain data on a magnetic field generated by at least one magnet 381. The processor 210 may identify whether a state of the electronic device 200 is a first state (e.g., the folding state) among a plurality of states based on the data on the magnetic field obtained using the hall sensor 241. According to an embodiment, the processor 210 may identify an angle 305 by using the hall sensor 241.

According to an embodiment, the hall sensor 241 may be disposed in the first housing 310. The magnet 381 may be disposed in the second housing 320. For example, the magnet 381 may be disposed at a position corresponding to a position of the hall sensor 241, in the second housing 320.

FIG. 4 illustrates an example in which the hall sensor 241, the magnet 381, the first inertial sensor 242-1, and the second inertial sensor 242-2 are disposed in the electronic device 200, but is not limited thereto. The hall sensor 241, the magnet 381, the first inertial sensor 242-1, and the second inertial sensor 242-2 may be variously disposed to identify the angle 305 between the first display area 331 and the second display area 332.

According to an embodiment, the electronic device 200 may provide a plurality of states based on a positional relationship between the first housing 310 and the second housing 320. For example, the electronic device 200 may provide a plurality of states based on the angle 305 between the first display area 331 and the second display area 332. For example, the electronic device 200 may provide a plurality of states based on an angle between the first direction 391 in which the first surface 311 (or the first display area 331) faces and the second direction 392 in which the third surface 321 (or the second display area 332) faces.

For example, the electronic device 200 may provide a first state corresponding to a first angle between the first direction 391 in which the first surface 311 (or the first display area 331) faces and the second direction 392 in which the third surface 321 (or the second display area 332) faces, which is greater than or equal to a first predetermined angle (e.g., about 178 degrees). For example, the electronic device 200 may identify a state of the electronic device 200 as the first state, based on the first direction 391 and the second direction 392 being opposite to each other. For example, the electronic device 200 may identify the state of the electronic device 200 as the first state, based on the first angle between the first direction and the second direction 392 being 180 degrees. For example, the electronic device 200 may provide the first state corresponding to a first angle between the first housing 310 and the second housing 320 is less than or equal to "180 degrees—the first predetermined angle" (or a fourth predetermined angle). For example, the first state may be referred to as a folding state. For example, the first state may be referred to as a 'flex state 0'. For example, while a state of the electronic device 200 is the first state, the second display 232 may be activated.

For example, the electronic device 200 may provide a second state corresponding to a second angle between the first direction 391 in which the first surface 311 (or the first display area 331) faces and the second direction 392 in which the third surface 321 (or the second display area 332) faces is greater than or equal to a second predetermined angle (e.g., about 100 degrees) and less than the first predetermined angle (e.g., about 178 degrees). For example, the electronic device 200 may provide the second state corresponding to a second angle between the first housing 310 and the second housing 320 is greater than "180 degrees—the first predetermined angle" (or the fourth predetermined angle) and less than or equal to "180 degrees—the second predetermined angle" (or a fifth predetermined angle). For example, the second state may be referred to as a sub-folding state. For example, the second state may be referred to as a 'flex state 1'. For example, while the state of the electronic device 200 is the second state, the second display 232 may be activated.

For example, the electronic device 200 may provide a third state corresponding to a third angle between the first direction 391 in which the first surface 311 (or the first display area 331) faces and the second direction 392 in which the third surface 321 (or the second display area 332) faces is greater than or equal to a third predetermined angle (e.g., about 20 degrees) and less than the second predetermined angle (e.g., about 100 degrees). For example, the electronic device 200 may provide the third state corresponding to a third angle between the first housing 310 and the second housing 320 is greater than "180 degrees—the second predetermined angle" (or the fifth predetermined angle) and less than or equal to "180 degrees—the third predetermined angle" (or a sixth predetermined angle). For example, the third state may be referred to as a sub-folding state. For example, the third state may be referred to as a 'flex state 2'. For example, while the state of the electronic device 200 is the third state, the first display 231 may be activated.

For example, the electronic device 200 may provide a fourth state corresponding to a fourth angle between the first direction 391 in which the first surface 311 (or the first display area 331) faces and the second direction 392 in which the third surface 321 (or the second display area 332) faces is less than the third predetermined angle (e.g., about 20 degrees). For example, the electronic device 200 may provide the fourth state corresponding to a fourth angle between the first housing 310 and the second housing 320 is greater than "180 degrees—the third predetermined angle" (or the sixth predetermined angle). For example, the fourth state may be referred to as an unfolding state. For example, the fourth state may be referred to as a 'flex state 3'. For example, while the state of the electronic device 200 is the fourth state, the first display 231 may be activated.

According to an embodiment, the first to third predetermined angles described above may be changed. For example, the first to third predetermined angles may be changed, determined, or defined based on a UX concept and/or a request of a client (or client program). In the above-described embodiment, one of the plurality of states is identified based on an angle between the first direction 391 in which the first surface 311 (or the first display area 331) faces and the second direction 392 in which the third surface 321 (or the second display area 332) faces, but is not limited thereto.

According to an embodiment, in the first state, the first display 231 may be in a folded state. In the first state, the first display 231 may not be used. The first state may be a state in which a length of the electronic device 200 is shortened to protect the first display 231 and to facilitate portability. The processor 210 may auxiliary use the second display 232 in the first state. The processor 210 may provide summarized content through the second display 232 in the first state. The processor 210 may provide full content, based on being changed a state of the electronic device 200 from the first state to one of the third state and/or the fourth state in which the first display 231 is activated.

According to an embodiment, in the fourth state, the electronic device 200 may provide the first display area 331 and the second display area 332 on a single plane by using the first display 231.

According to an embodiment, in the second state and the third state, the electronic device 200 may provide a physically separated screen. For example, the electronic device 200 may provide a screen in which the first display area 331 and the second display area 332 are physically separated as the first display 231 is folded. The processor 210 may provide a service (e.g., an application service or a split screen service) for a physically separated screen. For example, the processor 210 may set the first display area 331 as an output portion. The processor 210 may provide an image or content through the first display area 331. The processor 210 may set the second display area 332 as an input portion. The processor 210 may provide an interface (e.g., keyboard) for input through the second display area 332. According to an embodiment, in a state that the second housing 320 is placed on a surface corresponding to the ground, the electronic device 200 may set the first display area 331 as the output portion and the second display area 332 as the input portion. In a state that the first housing 310 is placed on a surface corresponding to the ground, the electronic device 200 may set the first display area 331 as the input portion and the second display area 332 as the output portion.

According to an embodiment, the electronic device 200 may operate in a state in which a surface of a housing (e.g., the first housing 310 or the second housing 320) is placed on a surface corresponding to the ground. For example, when the electronic device 200 operates in a state that a surface of a housing (e.g., the first housing 310 or the second housing 320) is placed on a surface corresponding to the ground, the electronic device 200 may operate in a tabletop mode. For example, while the electronic device 200 operates in the tabletop mode, a user may use one of the first display area 331 and the second display area 332 of the first display 231 by making it stand up. The user may adjust the angle 305 between the first housing 310 and the second housing 320. For example, while the electronic device 200 operates in the tabletop mode, the processor 210 may display content in a display area facing the user among the first display area 331 and the second display area 332 of the first display 231. According to an embodiment, a camera may be disposed in the first display area 331. In a state that the user does not grip the electronic device 200, the processor 210 may provide a service using a camera. For example, in a state that the user does not grip the electronic device 200, the processor 210 may provide a service for a video call or personal broadcasting.

According to an embodiment, the processor 210 may provide various modes according to a posture of the electronic device 200 in addition to the above-described tabletop mode.

Figure 5:
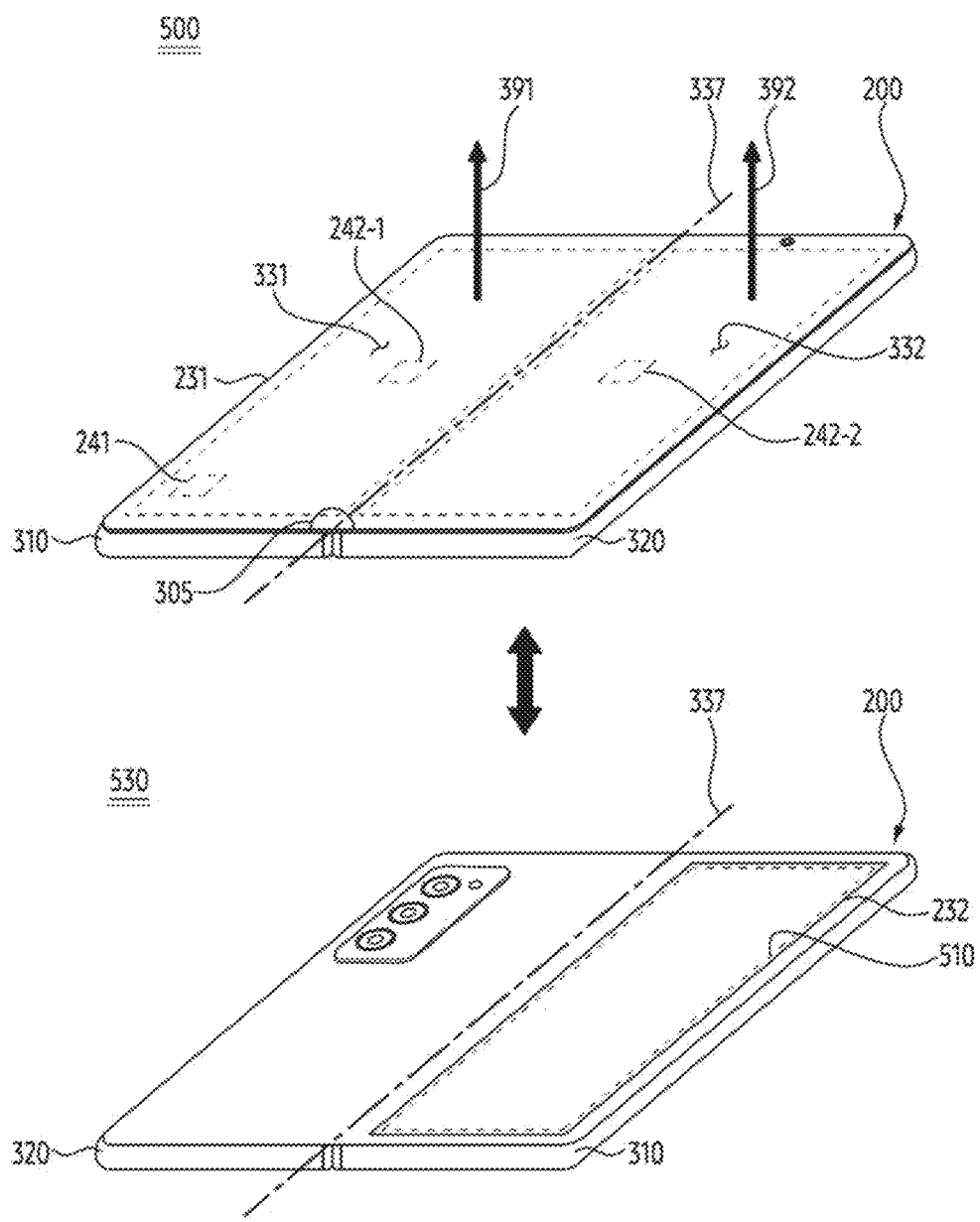
FIG. 5 illustrates an example of a top view and a bottom view of an electronic device in an unfolding state of the electronic device, according to an embodiment.

In FIGS. 3A, 3B, and 4 described above, the electronic device 200 in which the first display 231 is folded along a first direction (e.g., a horizontal direction) is illustrated, but embodiments of the disclosure are not limited thereto. FIG. 5 may illustrate the electronic device 200 in which the first display 231 is folded along a second direction (e.g., a vertical direction) perpendicular to the first direction.

FIG. 5 illustrates an example of a top view and a bottom view of an electronic device in an unfolding state of the electronic device, according to an embodiment.

Referring to FIG. 5, a state 500 indicates a top view of an electronic device 200 in the unfolding state. A state 530 indicates a bottom view of the electronic device 200 in the unfolding state.

The electronic device 200 may include a first housing 310 and a second housing 320. The electronic device 200 may be folded so that the first housing 310 and the second housing 320 are stacked or overlapped each other. The electronic device 200 may include a hinge for configuring the first housing 310 and the second housing 320 to be folded along a folding axis 337. For example, the folding axis 337 may mean a reference for folding the electronic device 200.

According to an embodiment, a first display 231 of the electronic device 200 may be configured as a flexible display. The first display 231 of the electronic device 200 may be folded with respect to the folding axis 337. For example, the first display 231 may include a first display area 331 and a second display area 332. The second display area 332 may be adjacent to the first display area 331 along the folding axis 337. For example, a display area of the first display 231 may be separated into the first display area 331 and the second display area 332 based on the folding axis 337.

Referring to the state 530, the electronic device 200 may include a second display 232 for providing the first housing 310 with a fourth display area 510 facing the first display area 331.

According to an embodiment, the electronic device 200 may include a hall sensor 241 including a magnet 381, a first inertial sensor 242-1, and a second inertial sensor 242-2. For example, the hall sensor 241 may be disposed in the first housing 310. The first inertial sensor 242-1 may be disposed in the first housing 310. The second inertial sensor 242-2 may be disposed in the second housing 320. The positions on which the hall sensor 241, the first inertial sensor 242-1, and the second inertial sensor 242-2 are disposed are illustrative and embodiments of the disclosure are not limited thereto. According to an embodiment, the positions of each of the hall sensor 241, the first inertial sensor 242-1, and the second inertial sensor 242-2 may be changed.

The electronic device 200 illustrated in FIGS. 3A and 3B and the electronic device 200 illustrated in FIG. 5 may have different folding directions. In addition, in the electronic device 200 illustrated in FIGS. 3A and 3B, an external camera may be disposed within the first housing 310. In the electronic device 200 illustrated in FIG. 5, the external camera may be disposed within the second housing 320.

According to an embodiment, the electronic device 200 may provide a plurality of states according to an angle between the first housing 310 and the second housing 320. The plurality of states may correspond to the plurality of states described in FIG. 4. According to an embodiment, in the second state and the third state among the plurality of states described in FIG. 4, the electronic device 200 may operate in a flex mode.

For example, the second state may mean a state in which an angle between a first direction 391 in which the first display area 331 faces and a second direction 392 in which the second display area 332 faces is greater than or equal to a second predetermined angle (e.g., about 100 degrees) and less than a first predetermined angle (e.g., about 178 degrees). For example, the third state may mean a state in which the angle between the first direction 391 in which the first display area 331 faces and the second direction 392 in which the second display area 332 faces is greater than or equal to a third predetermined angle (e.g., about 20 degrees) and less than the second predetermined angle (e.g., about 100 degrees).

For example, the flex mode may mean a mode for the electronic device 200 to operate in the second state and the third state. For example, in the flex mode, the processor 210 may provide a screen in which the first display area 331 and the second display area 332 are separated.

According to an embodiment, the electronic device 200 may be configured based on one of the form factor illustrated in FIGS. 3A, 3B, and 4 and the form factor illustrated in FIG. 5. Hereinafter, for convenience of explanation, the following embodiments may be described based on the electronic device 200 configured based on the form factor illustrated in FIGS. 3A, 3B, and 4. However, embodiments of the disclosure are not limited thereto. For example, the electronic device 200 described below may be configured based on the form factor illustrated in FIG. 5.

Figure 6:
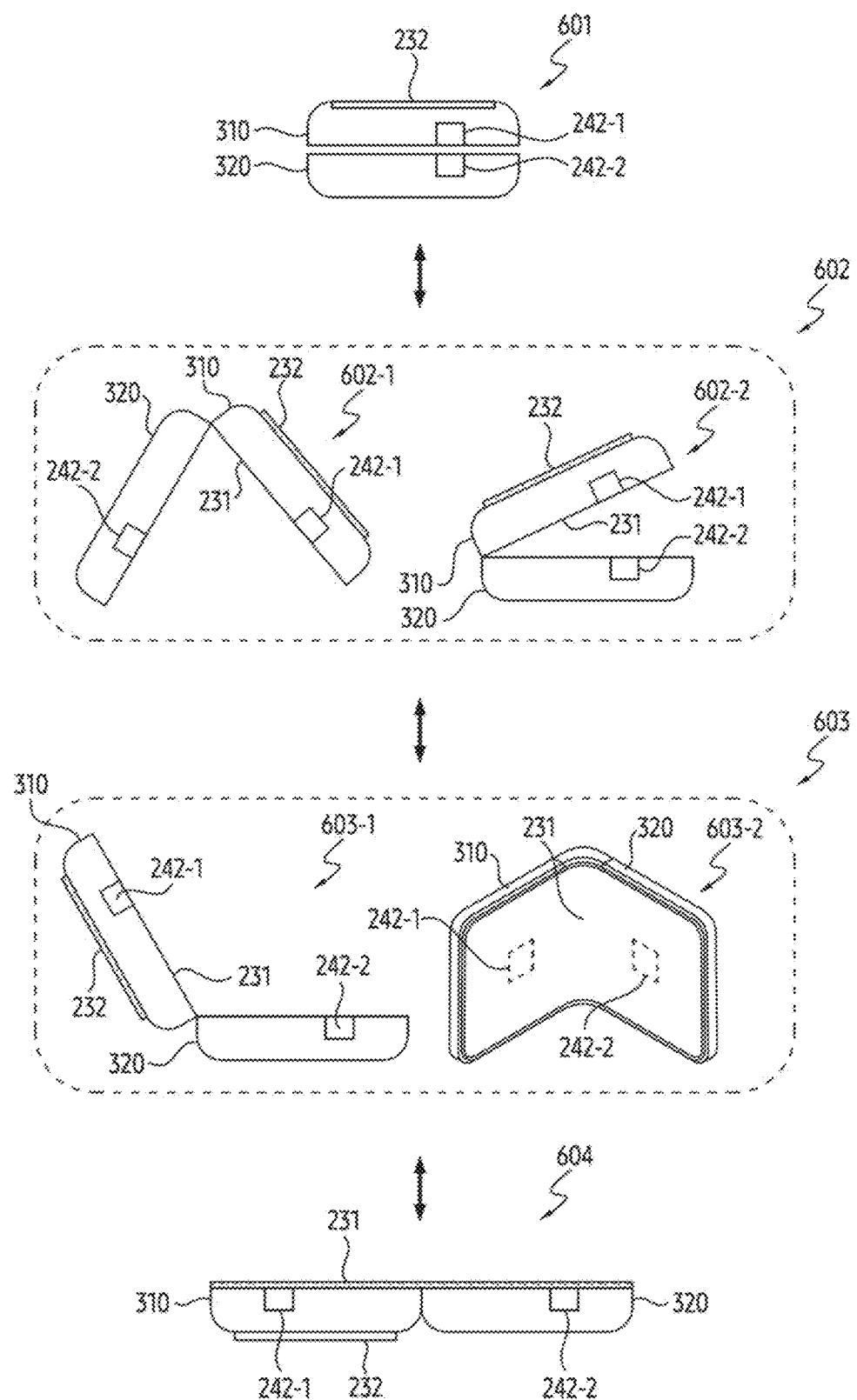
FIG. 6 illustrates an example of a plurality of states of an electronic device according to an embodiment.

FIG. 6 illustrates an example of a plurality of states of an electronic device according to an embodiment.

An electronic device 200 described in FIG. 6 may correspond to the electronic device 200 illustrated in FIGS. 3A, 3B, and 4. Hereinafter, for convenience of explanation, a plurality of states of the electronic device 200 will be described based on the electronic device 200 illustrated in FIGS. 3A, 3B, and 4.

Referring to FIG. 6A, the electronic device 200 may provide one of the plurality of states based on an angle 305 between a first housing 310 and a second housing 320. For example, the electronic device 200 may provide one of first to fourth states based on the angle 305 between the first housing 310 and the second housing 320. For example, the processor 210 may identify the angle 305 (or an angle between a first direction 391 in which a first surface 311 (or a first display area 331) faces and a second direction 392 in which a third surface 321 (or a second display area 332) faces) between the first housing 310 and the second housing 320, by using at least a part of a hall sensor 241, a first inertial sensor 242-1 and a second inertial sensor 242-2. The processor 210 may identify a state of the electronic device 200 as one of the plurality of states, based on the angle 305.

In a first state 601, an angle between the first direction 391 in which the first surface 311 (or the first display area 331) of the first display 231 faces and the second direction 392 in which the third surface 321 (or the second display area 332) faces may be greater than or equal to a first predetermined angle (e.g., about 178 degrees). For example, an angle between the first housing 310 and the second housing 320 may be less than or equal to a fourth predetermined angle (e.g., about 2 degrees). For example, the first state 601 may be referred to as a folding state. Since the first display 231 is folded in the first state 601, the second display 232 may be activated.

In the second state 602, the angle between the first direction 391 in which the first surface 311 (or the first display area 331) faces and the second direction 392 in which the third surface 321 (or the second display area 332) faces may be greater than or equal to a second predetermined angle (e.g., about 100 degrees) and less than the first predetermined angle (e.g., about 178 degrees). For example, the angle between the first housing 310 and the second housing 320 may be greater than the fourth predetermined angle (e.g., about 2 degrees) and less than or equal to a fifth predetermined angle (e.g., about 80 degrees). For example, the second state 602 may be referred to as a sub-folding state. In the second state 602, the second display 232 may be activated.

For example, in the second state 602, the electronic device 200 may operate in one of a first mode 602-1 and a second mode 602-2. The processor 210 may identify a posture of the electronic device 200 based on the inertial sensor 242. The processor 210 may set a mode of the electronic device 200 to one of the first mode 602-1 and the second mode 602-2, based on the posture of the electronic device 200.

For example, while the posture of the electronic device 200 is a posture in which the first display 231 (or the first display area 331 and the second display area 332) faces the ground, the processor 210 may set the mode of the electronic device 200 to the first mode 602-1. For example, while the electronic device 200 operates in the first mode 602-1, the second display 232 may be activated. While the electronic device 200 operates in the first mode 602-1, a first screen may be displayed. For example, the first screen may refer to a screen displayed based on a display mode (or a display direction) according to the first mode 602-1. The first mode 602-1 may be referred to as a flex tent mode.

For example, while the posture of the electronic device 200 is a posture in which a surface of the second housing 320 is placed on a surface corresponding to the ground, the processor 210 may set the mode of the electronic device 200 to the second mode 602-2. For example, while the electronic device 200 operates in the second mode 602-2, the second display 232 may be activated. While the electronic device 200 operates in the second mode 602-2, a second screen may be displayed. For example, the second screen may mean a screen displayed based on a display mode (or a display direction) according to the second mode 602-2. For example, the second screen may be a screen in which the first screen displayed in the second mode 602-2 is rotated by 180 degrees. The second mode 602-2 may be referred to as a flex cover mode.

In the third state 603, the angle between the first direction 391 in which the first surface 311 (or the first display area 331) of the first display 231 faces and the second direction 392 in which the third surface 321 (or the second display area 332) faces may be greater than or equal to a third predetermined angle (e.g., about 20 degrees) and less than the second predetermined angle (e.g., about 100 degrees). For example, the angle between the first housing 310 and the second housing 320 may be greater than the fifth predetermined angle (e.g., about 80 degrees) and less than or equal to a sixth predetermined angle (e.g., about 160 degrees). For example, the third state 603 may be referred to as a sub-folding state. In the third state 603, the first display 231 may be activated.

For example, in the third state 603, the electronic device 200 may operate in one of a third mode 603-1 and a fourth mode 603-2. The processor 210 may identify a posture of the electronic device 200 based on the inertial sensor 242. The processor 210 may set a mode of the electronic device 200 to one of the third mode 603-1 and the fourth mode 603-2, based on the posture of the electronic device 200.

For example, while the posture of the electronic device 200 is a posture in which a surface of the second housing 320 is placed on a surface corresponding to the ground, the processor 210 may set the mode of the electronic device 200 to the third mode 603-1. For example, while the electronic device 200 operates in the third mode 603-1, the first display 231 may be activated. While the electronic device 200 operates in the third mode 603-1, a third screen may be displayed through the first display 231. The third screen may be configured based on the landscape mode.

As an example, while the posture of the electronic device 200 is a posture in which the first direction 391 in which the first surface 311 (or the first display area 331) faces and the second direction 392 in which the third surface 321 (or the second display area 332) faces are substantially parallel to the ground, the processor 210 may set the mode of the electronic device 200 to the fourth mode 603-2. For example, while the electronic device 200 operates in the fourth mode 603-2, the first display 231 may be activated. While the electronic device 200 operates in the fourth mode 603-2, a fourth screen may be displayed through the first display 231. The fourth screen may be configured based on the landscape mode.

In the fourth state 604, the angle between the first direction 391 in which the first surface 311 (or the first display area 331) of the first display 231 faces and the second direction 392 in which the third surface 321 (or the second display area 332) faces may be less than the third predetermined angle. For example, the angle between the first housing 310 and the second housing 320 may be greater than or equal to the sixth predetermined angle. For example, the fourth state 604 may be referred to as the unfolding state. In the fourth state 604, the first display 231 may be activated.

Figure 7:
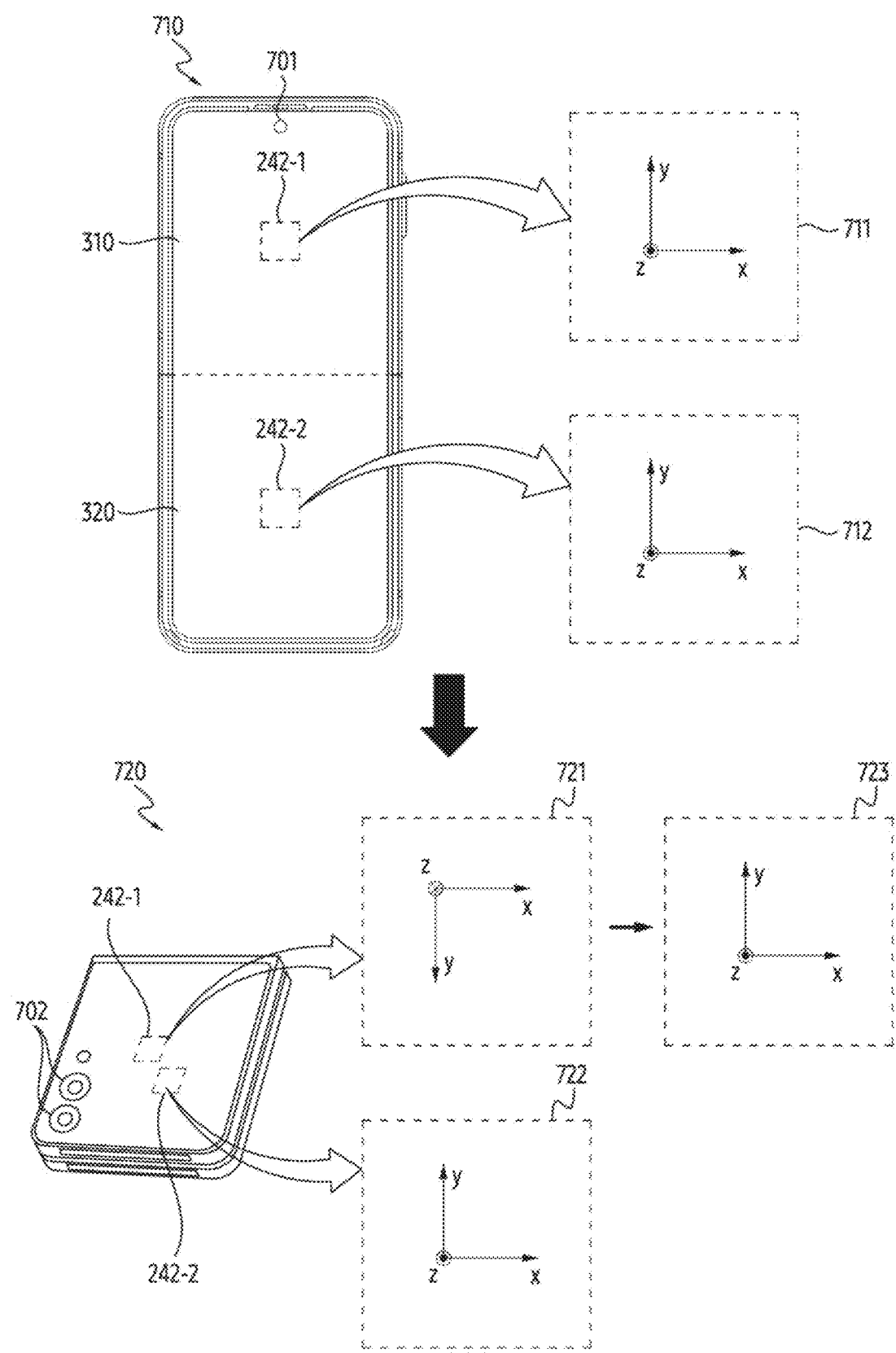
FIG. 7 illustrates an example of an operation of an electronic device for changing an axis of an inertial sensor according to an embodiment.

FIG. 7 illustrates an example of an operation of an electronic device for changing an axis of an inertial sensor according to an embodiment.

Referring to FIG. 7, in a state 710 and a state 720, an electronic device 200 may include a first inertial sensor 242-1 and a second inertial sensor 242-2. The first inertial sensor 242-1 may be disposed within a first housing 310. The second inertial sensor 242-2 may be disposed within a second housing 320.

The state 710 may indicate the electronic device 200 in a fourth state. In the state 710, the processor 210 may identify a posture of the electronic device 200 using the first inertial sensor 242-1. The processor 210 may use the second inertial sensor 242-2 as an auxiliary inertial sensor for identifying the posture of the electronic device 200. The processor 210 may identify a state of the electronic device 200, by using the first inertial sensor 242-1 and the second inertial sensor 242-2.

For example, a plurality of axes of the first inertial sensor 242-1 may be configured as in an example 711. In the example 711, the x-axis of the first inertial sensor 242-1 may be configured to be parallel to an axis between the first housing 310 and the second housing 320. The z-axis of the first inertial sensor 242-1 may be configured in a direction in which a first display 231 faces. The y-axis of the first inertial sensor 242-1 may be configured in a direction perpendicular to the x-axis and the z-axis.

For example, a plurality of axes of the second inertial sensor 242-2 may be configured as in an example 712. In the example 712, a plurality of axes of the second inertial sensor 242-2 may be configured the same as the plurality of axes of the first inertial sensor 242-1.

In the state 720, the processor 210 may identify that a state of the electronic device 200 is changed from the fourth state to a first state. For example, the processor 210 may identify that the state of the electronic device 200 is changed from the fourth state to the first state, based on an angle between a direction in which a first surface 311 of the first housing 310 faces and a direction in which a third surface 321 of the second housing 320 faces. The processor 210 may change at least one axis related to the first inertial sensor 242-1, based on identifying the state of the electronic device 200 as the first state.

For example, as the first housing 310 rotates based on an axis between the first housing 310 and the second housing 320, the direction of the plurality of axes of the first inertial sensor 242-1 may be changed. The plurality of axes of the first inertial sensor 242-1 may be configured as in an example 721. When the plurality of axes are configured as in the example 721, a display direction of the second display 232 may be set in reverse. Accordingly, the processor 210 may change the plurality of axes of the first inertial sensor 242 as in the example 723. As an example, the processor 210 may configure the plurality of axes of the first inertial sensor 242 to be the same as the plurality of axes of the second inertial sensor 242-2 of the example 722. For example, the processor 210 may set the y-axis and z-axis directions of the first inertial sensor 242-1 in reverse.

For example, as a state of the electronic device 200 is changed from the fourth state to the first state, the processor 210 may maintain the inertial sensor for identifying a posture of the electronic device 200 as the first inertial sensor 242-1. When the inertial sensor for identifying a posture of the electronic device 200 is changed according to a change in the state of the electronic device 200, a delay may occur, and data obtained immediately after the inertial sensor is activated may be inaccurate.

For example, when the second inertial sensor 242-2 is used to set a display mode of the second display 232, a direction for identifying the display mode of the second display 232 may be inaccurate. Since the second inertial sensor 242-2 is disposed within the second housing 320 and the second display 232 is disposed on the first housing 310, the second inertial sensor 242-2 may not be suitable for setting the display mode of the second display 232.

Accordingly, the processor 210 may maintain the inertial sensor for identifying a posture of the electronic device 200 as the first inertial sensor 242-1 according to a change in the state of the electronic device 200. As an example, an axis of the first inertial sensor 242-1 in the first state may be different from an axis of the first inertial sensor 242-1 in the fourth state. As described above, the processor 210 may maintain the inertial sensor for identifying a posture of the electronic device 200 as the first inertial sensor 242-1, by changing a direction of at least one axis of the first inertial sensor 242-1 within the first state.

According to an embodiment, while the state of the electronic device 200 is in the first state, the processor 210 may change the display mode of the second display 232 by using the first inertial sensor 242-1. For example, while the state of the electronic device 200 is in the first state, the processor 210 may identify that the second display 232 rotates 180 degrees according to a rotation of the electronic device 200 using the first inertial sensor 242-1. Based on identifying that the second display 232 rotates 180 degrees, the processor 210 may rotate (e.g., rotate 180 degrees) a screen displayed through the second display 232.

According to an embodiment, the electronic device 200 may include a camera 701 disposed in a portion of an area of the first display 231 and a camera 702 disposed in a surface of the first housing 310 corresponding to the second display 232. For example, as the state of the electronic device 200 is changed from the state 710 to the state 720, the camera 701 may be deactivated. For example, the camera 702 may be activated in the state 720 as well as the state 710. In an embodiment, the camera 702 may operate while the electronic device 200 is in a tabletop mode. For example, the camera 702 may operate in a state of being disposed toward a user of the electronic device 200, while the electronic device 200 is in a tabletop mode.

In the following specification, an embodiment for setting a display mode of the second display 232 while an angle between a direction in which the first surface 311 of the first housing 310 of the electronic device 200 faces and a direction in which the third surface 321 of the second housing 320 faces is within a designated range will be described. For example, while the angle between the direction in which the first surface 311 faces and the direction in which the third surface 321 faces is within the designated range, the processor 210 may set a display mode of the second display 232 based on a posture of the electronic device 200.

Figure 8A:
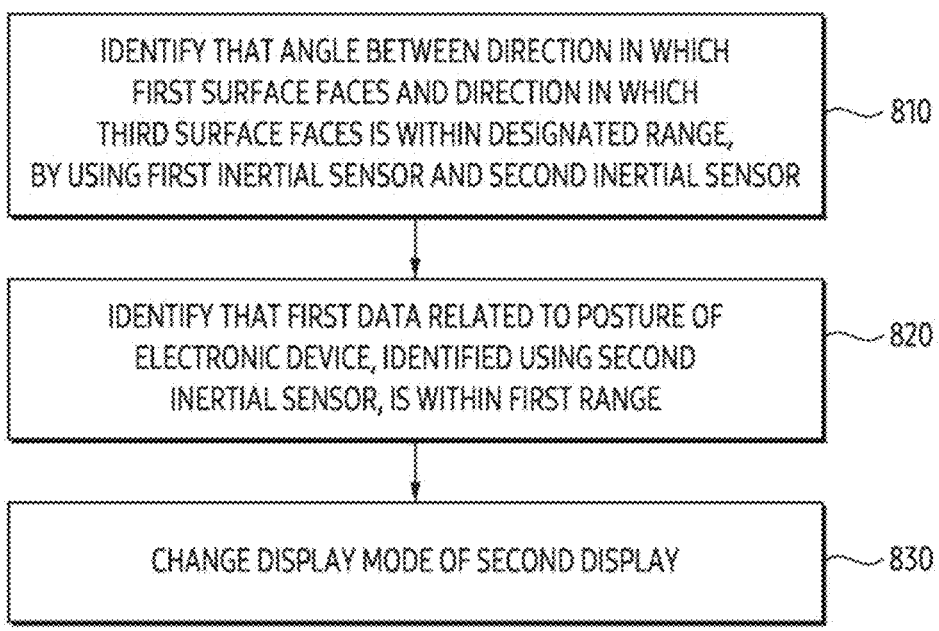
FIG. 8A is a flowchart illustrating an operation of an electronic device according to an embodiment.

FIG. 8A is a flowchart illustrating an operation of an electronic device according to an embodiment. In the following embodiment, each operation may be performed sequentially, but is not necessarily performed sequentially. For example, the sequence of each operation may be changed, and at least two operations may be performed in parallel.

Referring to FIG. 8A, in operation 810, a processor 210 may identify that an angle between a direction in which a first surface 311 of a first housing 310 faces and a direction in which a third surface 321 of a second housing 320 faces is within a designated range, by using a first inertial sensor 242-1 and a second inertial sensor 242-2.

According to an embodiment, the processor 210 may identify the angle between the direction in which the first surface 311 faces and the direction in which the third surface 321 faces, based on first data obtained using the second inertial sensor 242-2 and second data obtained using the first inertial sensor 242-1. The processor 210 may identify that the angle is within the designated range.

For example, the designated range may include a range for setting a state of the electronic device 200 to the second state. While the angle between the direction in which the first surface 311 faces and the direction in which the third surface 321 faces is within the designated range, the state of the electronic device 200 may be set to the second state.

For example, the first surface 311 may correspond to a first display area 331 of the first display 231. The third surface 321 may correspond to a second display area 332 of the first display 231.

In operation 820, the processor 210 may identify that the first data, which is related to a posture of the electronic device 200 and is identified using the second inertial sensor 242-2, is within a first range. For example, based on identifying that the angle between the direction in which the first surface 311 faces and the direction in which the third surface 321 faces is within the designated range, the processor 210 may identify that the first data, which is related to a posture of the electronic device 200 and is identified using the second inertial sensor 242-2, is within the first range.

According to an embodiment, the processor 210 may identify first data for a posture of the electronic device 200 by using the second inertial sensor 242-2. The first data may include first acceleration data and first rotation data. The first acceleration data may indicate vector for gravity according to three directions of the x-axis, y-axis, and z-axis of the second inertial sensor 242-2. The first rotation data may indicate an angular velocity according to the three directions of the x-axis, y-axis, and z-axis of the second inertial sensor 242-2.

According to an embodiment, the processor 210 may identify the first data for the posture of the electronic device 200 by using the second inertial sensor 242-2 disposed in the second housing 320 among the first inertial sensor 242-1 and the second inertial sensor 242-2. For example, the processor 210 may identify the first data for the posture of the electronic device 200, by using the second inertial sensor 242-2, in order to identify that a surface (e.g., the fourth surface) of the second housing 320 is located on a surface corresponding to the ground.

For example, the first range may include a range in which a surface (e.g., the fourth surface) of the second housing 320 is located on a surface corresponding to the ground. For example, while the first data is within the first range, a surface (e.g., the fourth surface) of the second housing 320 may be located on the surface corresponding to the ground. Based on identifying that the first data is within the first range, the processor 210 may identify that a surface (e.g., the fourth surface) of the second housing 320 is located on the surface corresponding to the ground.

For example, the processor 210 may identify that the first data is within the first range. The first range may be set as a range for identifying that a surface (e.g., the fourth surface) of the second housing 320 is located on the surface corresponding to the ground. The first range may include ranges corresponding to angles identified based on the x-axis, y-axis, and z-axis. As an example, the first range may include a range with respect to the x-axis, a range with respect to the y-axis, and a range with respect to the z-axis. Based on identifying that an angle value identified based on the x-axis is within the range with respect to the x-axis, an angle value identified based on the y-axis is within the range with respect to the y-axis, and an angle value identified based on the z-axis is within the range with respect to the z-axis, the processor 210 may identify that the first data is within the first range.

According to an embodiment, whether the first data on the posture of the electronic device 200 is within the first range may be provided to other components through an application programming interface (API).

In operation 830, the processor 210 may change the display mode of the second display 232. For example, the processor 210 may change the display mode of the second display 232 based on identifying that the first data is within the first range.

According to an embodiment, based on identifying that the first data is within the first range, the processor 210 may change the display mode of the second display 232 from a first display mode for displaying a first screen to a second display mode for displaying a second screen in which the first screen is rotated.

For example, the first display mode may include a mode in which a first corner (or first area) of the second display 232 adjacent to a folding axis 337 of the electronic device 200 is set as the top of the screen. For example, the first display mode may be referred to as a portrait mode. For example, the second display mode may include a mode in which a second corner (or second area) of the second display 232 adjacent to a corner of the first housing 310 opposite the folding axis 337 of the electronic device 200 is set as the top of the screen. For example, the second display mode may be referred to as a reverse portrait mode.

According to an embodiment, the processor 210 may identify that the electronic device 200 operates in a tabletop mode based on identifying that the first data is within the first range. Based on identifying that the electronic device 200 operates in the tabletop mode, the processor 210 may change the display mode of the second display 232 from the first display mode to the second display mode.

According to an embodiment, the processor 210 may identify that an angle between the direction in which the first surface 311 faces and the direction in which the third surface 321 faces is out of a designated range. Based on identifying that the angle between the direction in which the first surface 311 faces and the direction in which the third surface 321 faces is out of the designated range, the processor 210 may set the display mode of the second display 232 as the first display mode. For example, the processor 210 may set the display mode of the second display 232 as the first display mode, based on identifying that a state of the electronic device 200 is a first state (e.g., the first state of FIG. 4).

According to an embodiment, the processor 210 may identify that the first data is out of the first range. Based on identifying that the first data is out of the first range, the processor 210 may set the display mode of the second display 232 as the first display mode. For example, based on identifying that a posture of the electronic device 200 is a posture in which the first display 231 (or the first display area 331 and the second display area 332) faces the ground, the processor 210 may set the display mode of the second display 232 as the first display mode.

According to an embodiment, the processor 210 may identify that the angle between the direction in which the first surface 311 faces and the direction in which the third surface 321 faces is within the designated range, and the first data on the posture of the electronic device 200 is within the first range. Based on identifying that the angle between the direction in which the first surface 311 faces and the direction in which the third surface 321 faces is within the designated range, and the first data on the posture of the electronic device 200 is within the first range, the processor 210 may set the display mode of the second display 232 as the second display mode.

In FIG. 8A, an example in which the processor 210 identifies that the first data on the posture of the electronic device 200 identified using the second inertial sensor 242-2 is within the first range after identifying that the angle between the direction in which the first surface 311 faces and the direction in which the third surface 321 faces is within the designated range by using the first inertial sensor 242-1 and the second inertial sensor 242-2 is described, but is not limited thereto. For example, the processor 210 may identify that the first data, which is related to the posture of the electronic device 200 and is identified using the second inertial sensor 242-2, is within the first range, and then, may identify that the angle between the direction in which the first surface 311 faces and the direction in which the third surface 321 faces is within the designated range using the first inertial sensor 242-1 and the second inertial sensor 242-2.

Figure 8B:
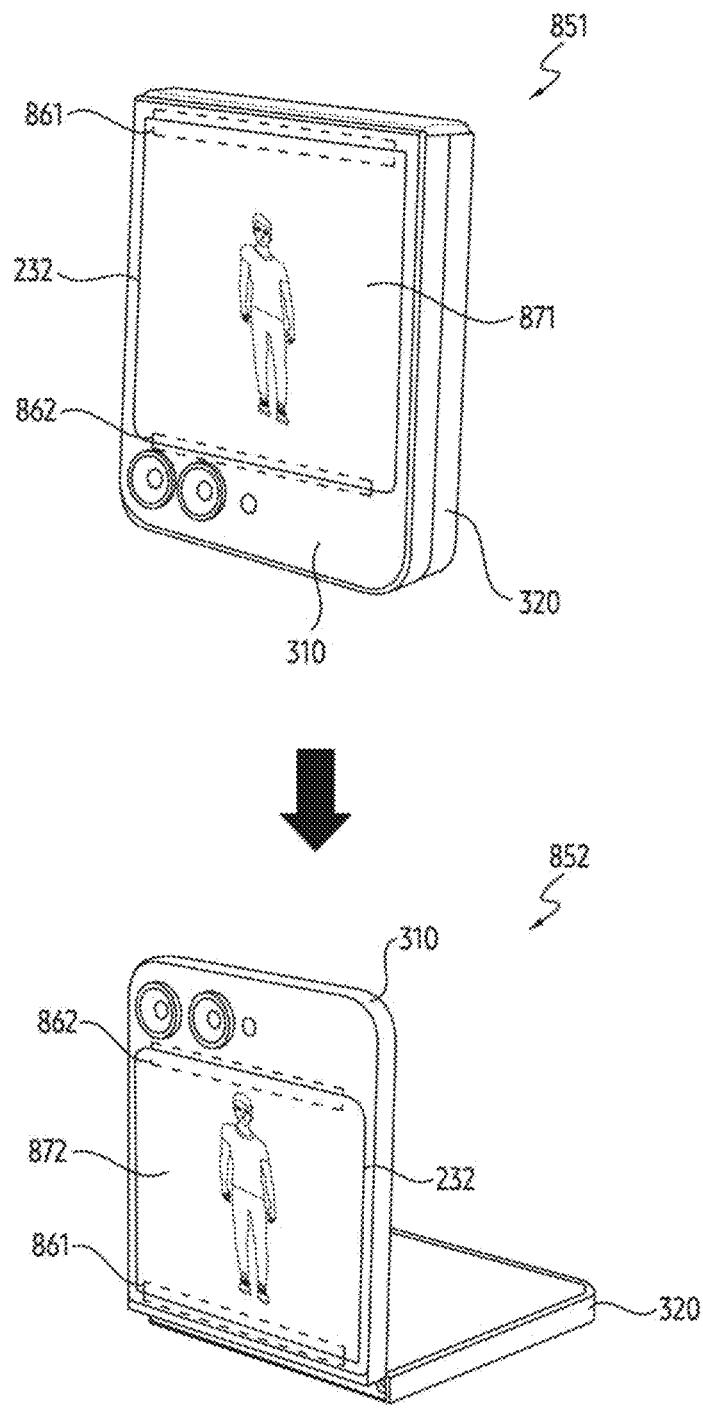
FIG. 8B illustrates an example of an operation of an electronic device according to an embodiment.

FIG. 8B illustrates an example of an operation of an electronic device according to an embodiment.

Referring to FIG. 8B, in state 851, the processor 210 may identify that the angle between the direction in which the first surface 311 faces and the direction in which the third surface 321 faces is out of the designated range using the first inertial sensor 242-1 and the second inertial sensor 242-2. For example, the processor 210 may identify that the state of the electronic device 200 is a second state, by using the first inertial sensor 242-1 and the second inertial sensor 242-2. For example, the processor 210 may identify that the angle between the direction in which the first surface 311 faces and the direction in which the third surface 321 faces is 180 degrees, by using the first inertial sensor 242-1 and the second inertial sensor 242-2.

The state 851 illustrates the electronic device 200 in a first state (e.g., the first state 601 of FIG. 6), but is not limited thereto. For example, in the state 851, the electronic device 200 may be in a third state (e.g., the third state 603 of FIG. 6) and a fourth state (e.g., the fourth state 604 of FIG. 6).

For example, the processor 210 may set the display mode of the second display 232 as the first display mode, based on identifying that the angle between the direction in which the first surface 311 faces and the direction in which the third surface 321 faces is out of the designated range. The processor 210 may display a first screen 871 based on a display mode of the second display 232, which is the first display mode. For example, the processor 210 may set a first corner 861 of the second display 232 to an upper end of the first screen 871, based on the display mode of the second display 232, which is the first display mode. For example, the processor 210 may set a second corner 862 of the second display 232 to a lower end of the first screen 871, based on the display mode of the second display 232, which is the first display mode.

In the state 851, the processor 210 may set the display mode of the second display 232 as the first display mode. According to an embodiment, the display mode of the second display 232 may be changed according to an application setting value. For example, in the state 851, the processor 210 may set the display mode of the second display 232 as the third display mode, based on identifying that an application operates based on the third display mode.

In state 852, the processor 210 may identify that the angle between the direction in which the first surface 311 of the first housing 310 faces and the direction in which the third surface 321 of the second housing 320 faces is within the designated range, by using the first inertial sensor 242-1 and the second inertial sensor 242-2. For example, in the state 852, the electronic device 200 may be in a second state (e.g., the second state 602 of FIG. 6).

According to an embodiment, the processor 210 may identify first data on a posture of the electronic device 200 by using the second inertial sensor 242-2. The processor 210 may identify that the first data on the posture of the electronic device 200 is within the first range.

According to an embodiment, the processor 210 may identify that the angle between the direction in which the first surface 311 faces and the direction in which the third surface 321 faces is within the designated range, and the first data on the posture of the electronic device 200 is within the first range. Based on identifying that the angle between the direction in which the first surface 311 faces and the direction in which the third surface 321 faces is within the designated range, and the first data on the posture of the electronic device 200 is within the first range, the processor 210 may change the display mode of the second display 232. For example, the processor 210 may change the display mode of the second display 232 from the first display mode to the second display mode. For example, the processor 210 may set a display mode of the second display 232 to the second display mode.

For example, the processor 210 may display a second screen 872, based on a display mode of the second display 232, which is the second display mode. For example, the processor 210 may set the second corner 862 of the second display 232 to an upper end of the second screen 872, based on the display mode of the second display 232, which is the second display mode. For example, the processor 210 may set the first corner 861 of the second display 232 to a lower end of the second screen 872, based on the display mode of the second display 232, which is the second display mode.

For example, a display direction of the second screen 872 may be opposite to a display direction of the first screen 871. The second screen 872 may include a screen in which the first screen 871 is rotated by 180 degrees. Based on identifying that the angle between a direction in which the first surface 311 faces and a direction in which the third surface 321 faces is within the designated range, and the first data on the posture of the electronic device 200 is within the first range, the processor 210 may rotate a screen displayed through the second display 232.

In FIG. 8B, an example in which a state of the electronic device 200 is changed from the state 851 to the state 852 is described, but embodiments of the disclosure are not limited thereto. When the state of the electronic device 200 is changed from the state 852 to the state 851, the display mode of the second display 232 may be changed from the second display mode to the first display mode. For example, while the first data is within the first range, the processor 210 may identify that the angle between the direction in which the first surface 311 faces and the direction in which the third surface 321 faces is out of the designated range. The processor 210 may set the display mode of the second display 232 as the first display mode, based on identifying that the angle between the direction in which the first surface 311 faces and the direction in which the third surface 321 faces is out of the designated range. For example, regardless of the posture of the electronic device 200, the processor 210 may set the display mode of the second display 232 as the first display mode, based on identifying that the angle between the direction in which the first surface 311 faces and the direction in which the third surface 321 faces is out of the designated range.

Figure 9:
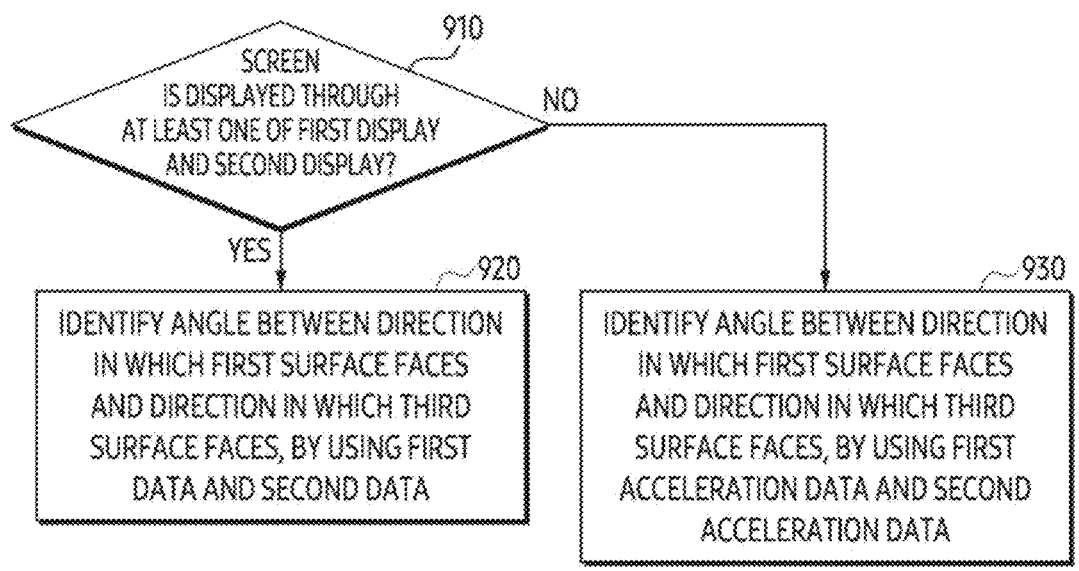
FIG. 9 is a flowchart illustrating an operation of an electronic device according to an embodiment.

FIG. 9 is a flowchart illustrating an operation of an electronic device according to an embodiment. In the following embodiment, each operation may be performed sequentially, but is not necessarily performed sequentially. For example, the sequence of each operation may be changed, and at least two operations may be performed in parallel.

Operations 910 to 930 illustrated in FIG. 9 may be related to the operation 810 of FIG. 8A. For example, based on operations 910 to 930, a processor 210 may identify an angle between a direction in which a first surface 311 faces and a direction in which a third surface 321 faces.

Referring to FIG. 9, in operation 910, the processor 210 may identify whether a screen is displayed through at least one of a first display 231 and a second display 232. For example, the processor 210 may identify whether at least one of the first display 231 and the second display 232 is turned on.

According to an embodiment, the processor 210 may identify whether one of the first display 231 and the second display 232 is activated. For example, one of the first display 231 and the second display 232 being activated may be different from the screen being displayed through one of the first display 231 and the second display 232. For example, the processor 210 may set a main display as the first display 231, based on activation of the first display 231. The processor 210 may set a sub-display as the second display 232 based on the activation of the first display 231. For example, the processor 210 may set the main display as the second display 232 based on activation of the second display 232. The processor 210 may set the sub-display as the first display 231 based on the activation of the second display 232.

For example, when a state of the electronic device 200 is one of a first state and a second state, the processor 210 may activate the second display 232. The processor 210 may set the second display 232 as the main display, based on that the state of the electronic device 200 is one of the first state and the second state. While the state of the electronic device 200 is one of the first state and the second state, the processor 210 may display a screen on the second display 232 in response to a user input. As an example, the processor 210 may identify that an angle between the direction in which the first surface 311 faces and the direction in which the third surface 321 faces is changed within the designated range. The processor 210 may deactivate the first display 231 and activate the second display 232, based on identifying that the angle between the direction in which the first surface 311 faces and the direction in which the third surface 321 faces is changed within the designated range.

For example, when a state of the electronic device 200 is one of a third state and a fourth state, the processor 210 may activate the first display 231. The processor 210 may set the first display 231 as the main display based on that the state of the electronic device 200 is one of the third state and the fourth state. While the state of the electronic device 200 is one of the third state and the fourth state, the processor 210 may display a screen on the first display 231, in response to a user input.

According to an embodiment, in a state that one of the first display 231 and the second display 232 is activated, the processor 210 may identify whether a screen is displayed through at least one of the first display 231 and the second display 232. For example, the electronic device 200 may operate in a low power mode while a screen is not displayed through at least one of the first display 231 and the second display 232. For example, the electronic device 200 may operate in a normal mode different from the low power mode while the screen is displayed through at least one of the first display 231 and the second display 232.

In operation 920, in case that the screen is displayed through at least one of the first display 231 and the second display 232, the processor 210 may identify an angle between the direction in which the first surface 311 faces and the direction in which the third surface 321 faces by using the first data and the second data. For example, the first data and the second data may be related to a posture of the electronic device 200.

According to an embodiment, the processor 210 may obtain (or identify) the first data by using the second inertial sensor 242-2. For example, the processor 210 may obtain the first data for the posture of the electronic device 200 by using the second inertial sensor 242-2.

For example, the first data may include first acceleration data and first rotation data. For example, the processor 210 may obtain the first acceleration data using a second acceleration sensor included in the second inertial sensor 242-2. The processor 210 may obtain the first rotation data by using a second gyro sensor included in the second inertial sensor 242-2.

According to an embodiment, the processor 210 may obtain (or identify) the second data by using the first inertial sensor 242-1. For example, the processor 210 may obtain the second data on the posture of the electronic device 200 by using the first inertial sensor 242-1.

The second data may include second acceleration data and second rotation data. The processor 210 may obtain the second acceleration data using a first acceleration sensor included in the first inertial sensor 242-1. The processor 210 may obtain the second rotation data by using a first gyro sensor included in the first inertial sensor 242-1.

According to an embodiment, the processor 210 may identify an angle between the direction in which the first surface 311 faces and the direction in which the third surface 321 faces by using both the first data and the second data. For example, the processor 210 may identify the angle between the direction in which the first surface 311 faces and the direction in which the third surface 321 faces, based on the first acceleration data, the first rotation data, the second acceleration data, and the second rotation data. For example, the processor 210 may identify an angle between the direction in which the first surface 311 faces and the direction in which the third surface 321 faces, based on the first acceleration sensor, the second acceleration sensor, the first gyro sensor, and the second gyro sensor.

For example, the electronic device 200 may identify that the electronic device 200 operates in the normal mode different from the low power mode, based on a screen being displayed through at least one of the first display 231 and the second display 232. While the electronic device 200 operates in the normal mode, the processor 210 may identify the angle between the direction in which the first surface 311 faces and the direction in which the third surface 321 faces, by using all data identified by the first inertial sensor 242-1 and the second inertial sensor 242-2. When the screen is displayed through at least one of the first display 231 and the second display 232, the processor 210 may need to accurately identify the state of the electronic device 200 (or the angle between the direction in which the first surface 311 faces and the direction in which the third surface 321 faces). Accordingly, the processor 210 may use all data identified by the first inertial sensor 242-1 and the second inertial sensor 242-2, in order to accurately identify the state of the electronic device 200 (or the angle between the direction in which the first surface 311 faces and the direction in which the third surface 321 faces). According to an embodiment, the processor 210 may further use data identified through a hall sensor 241.

In operation 930, when the screen is not displayed on both the first display 231 and the second display 232, the processor 210 may identify the angle between the direction in which the first surface 311 faces and the direction in which the third surface 321 faces by using the first acceleration data and the second acceleration data.

According to an embodiment, the processor 210 may obtain (or identify) the first acceleration data using the second inertial sensor 242-2. The first acceleration data may be a portion of data obtained through the second inertial sensor 242-2. For example, the processor 210 may obtain the first acceleration data using the second acceleration sensor included in the second inertial sensor 242-2.

According to an embodiment, the processor 210 may obtain (or identify) the second acceleration data by using the first inertial sensor 242-1. The second acceleration data may be a portion of data obtained through the first inertial sensor 242-1. For example, the processor 210 may obtain the second acceleration data, by using the first acceleration sensor included in the first inertial sensor 242-1.

According to an embodiment, the processor 210 may identify the angle between the direction in which the first surface 311 faces and the direction in which the third surface 321 faces by using the first acceleration data and the second acceleration data. For example, the processor 210 may identify the angle between the direction in which the first surface 311 faces and the direction in which the third surface 321 faces, based on the first acceleration sensor and the second acceleration sensor.

For example, the electronic device 200 may identify that the electronic device 200 operates in the low power mode, based on that the screen is not displayed on the first display 231 and the second display 232. While the electronic device 200 operates in the low power mode, the processor 210 may identify the angle between the direction in which the first surface 311 faces and the direction in which the third surface 321 faces, by using a portion of data identified by the first inertial sensor 242-1 and the second inertial sensor 242-2. When the screen is not displayed through the first display 231 and the second display 232, the processor 210 may set an error range of the state (or the angle between the direction in which the first surface 311 faces and the direction in which the third surface 321 faces) of the electronic device 200 to be wide. Accordingly, the processor 210 may use a portion of data identified in the first inertial sensor 242-1 and the second inertial sensor 242-2.

According to an embodiment, the processor 210 may reduce current consumption by using a portion of the data identified in the first inertial sensor 242-1 and the second inertial sensor 242-2, based on that the screen is not displayed on the first display 231 and the second display 232. According to an embodiment, while the screen is not displayed on the first display 231 and the second display 232, an auxiliary processor may be used. While the screen is not displayed on the first display 231 and the second display 232, a main processor may be maintained in a sleep state. While the screen is not displayed on the first display 231 and the second display 232, the auxiliary processor may obtain the first acceleration data and the second acceleration data through the first acceleration sensor and the second acceleration sensor. Based on the first acceleration data and the second acceleration data, the auxiliary processor may identify the angle between the direction in which the first surface 311 faces and the direction in which the third surface 321 faces.

Figure 10:
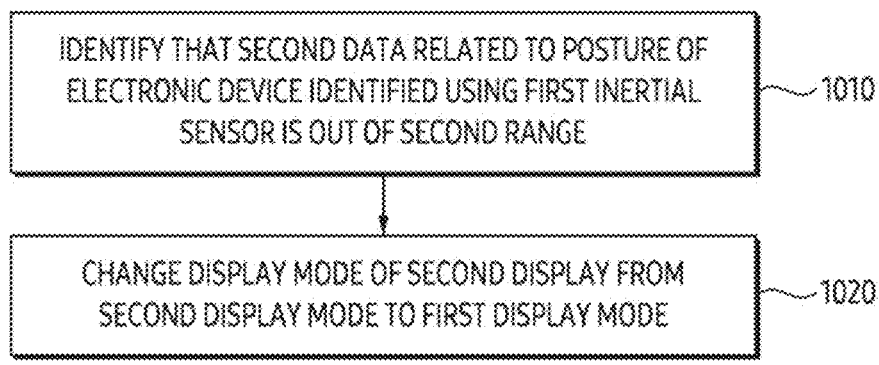
FIG. 10 is a flowchart illustrating an operation of an electronic device according to an embodiment.

FIG. 10 is a flowchart illustrating an operation of an electronic device according to an embodiment. In the following embodiment, each operation may be performed sequentially, but is not necessarily performed sequentially. For example, the sequence of each operation may be changed, and at least two operations may be performed in parallel.

Referring to FIG. 10, in operation 1010, a processor 210 may identify that second data for a posture of an electronic device 200 identified using a first inertial sensor 242-1 is out of a second range. For example, the second data may correspond to first data described in operation 820 of FIG. 8. The second data may be referred to as data obtained through the first inertial sensor 242-1. The first data may be referred to as data obtained through a second inertial sensor 242-2.

According to an embodiment, based on identifying whether the second data for the posture of the electronic device 200 is out of the second range, the processor 210 may identify whether an angle formed by a surface (e.g., a fourth surface) of a second housing 320 with respect to the ground is out of a reference range. For example, the processor 210 may identify whether a tabletop mode is released based on identifying whether the second data is out of the second range.

According to an embodiment, a first range and the second range may be distinguished from each other. The first range may be set to be narrower than the second range. For example, the first range may be set to identify whether the electronic device 200 operates in a state that a surface of a housing (e.g., the second housing 320) is placed on a surface corresponding to the ground. For example, while the electronic device 200 operates in a state that a surface of a housing (e.g., the second housing 320) is placed on a surface corresponding to the ground, the second range may be set to identify whether the electronic device 200 rotates.

For example, the first range may be configured to be narrower than the second range. The second range may be configured to be wider than the first range. As an example, the electronic device 200 may have a short horizontal axis (the x-axis) and thus may have a high sensitivity to inclination. Accordingly, the second range may be set wider than the first range so that the electronic device 200 does not react sensitively while the electronic device 200 operates in a state that a surface of a housing (e.g., the second housing 320) is placed on a surface corresponding to the ground.

As an example, the second range may be set wider than the first range so that the display mode of the second display 232 is not changed by a simple position movement of the electronic device 200.

In operation 1020, the processor 210 may change the display mode of the second display 232 from the second display mode to the first display mode. For example, the processor 210 may change the display mode of the second display 232 from the second display mode to the first display mode, based on identifying that the second data is out of the second range.

According to an embodiment, the processor 210 may maintain the display mode of the second display as the second display mode, based on identifying that the second data is maintained within the second range. The processor 210 may identify that the second data is maintained within the second range even when the movement of the electronic device 200 occurs. The processor 210 may maintain the display mode of the second display as the second display mode.

According to an embodiment, the second range may be changed based on a position and/or a direction in which the second inertial sensor 242-2 is disposed within the second housing 320. For example, the second data (or second acceleration data) obtained through the second inertial sensor 242-2 may be configured as the following equation.

$$fMagnitude = \sqrt{(accx \times accx) + (accy \times accy) + (accz \times accz)} \quad \text{[Equation 1]}$$

$$fAngleX = \operatorname{asin}\left(\frac{accx}{fMagnitude}\right) \times \text{RADIANS\_TO\_DEGREE} \quad \text{[Equation 2]}$$

$$fAngleY = \operatorname{asin}\left(\frac{accy}{fMagnitude}\right) \times \text{RADIANS\_TO\_DEGREE} \quad \text{[Equation 3]}$$

$$fAngleZ = \operatorname{asin}\left(\frac{accz}{fMagnitude}\right) \times \text{RADIANS\_TO\_DEGREE} \quad \text{[Equation 4]}$$

Referring to Equations 1, 2, 3, and 4, 'accx' is an acceleration value according to the x-axis. 'accy' is an acceleration value according to the y-axis. 'accz' is the acceleration value along the z-axis. 'RADIANS_TO_DEGREE' may be a constant for changing a radian value to an angle value. 'fmagnitude' indicates magnitude of acceleration (e.g., magnitude of gravity acceleration) identified through the second inertial sensor 242-2. 'fAngleX' is an angle value of a gravity direction identified based on the x-axis. 'fAngleY' is an angle value of a gravity direction identified based on the y-axis. 'fAngleZ' is an angle value of a gravity direction identified based on the z-axis.

For example, the processor 210 may obtain 'fAngleX', 'fAngleY', and 'fAngleZ' through the second inertial sensor 242-2. The processor 210 may identify that the second data is within the second range, based on identifying that 'fAngleX' is greater than or equal to −12 degrees and less than 12 degrees, 'fAngleY' is greater than or equal to −12 degrees and less than 12 degrees, and 'fAngleZ' is greater than or equal to 70 degrees and less than 90 degrees.

Figure 11A:
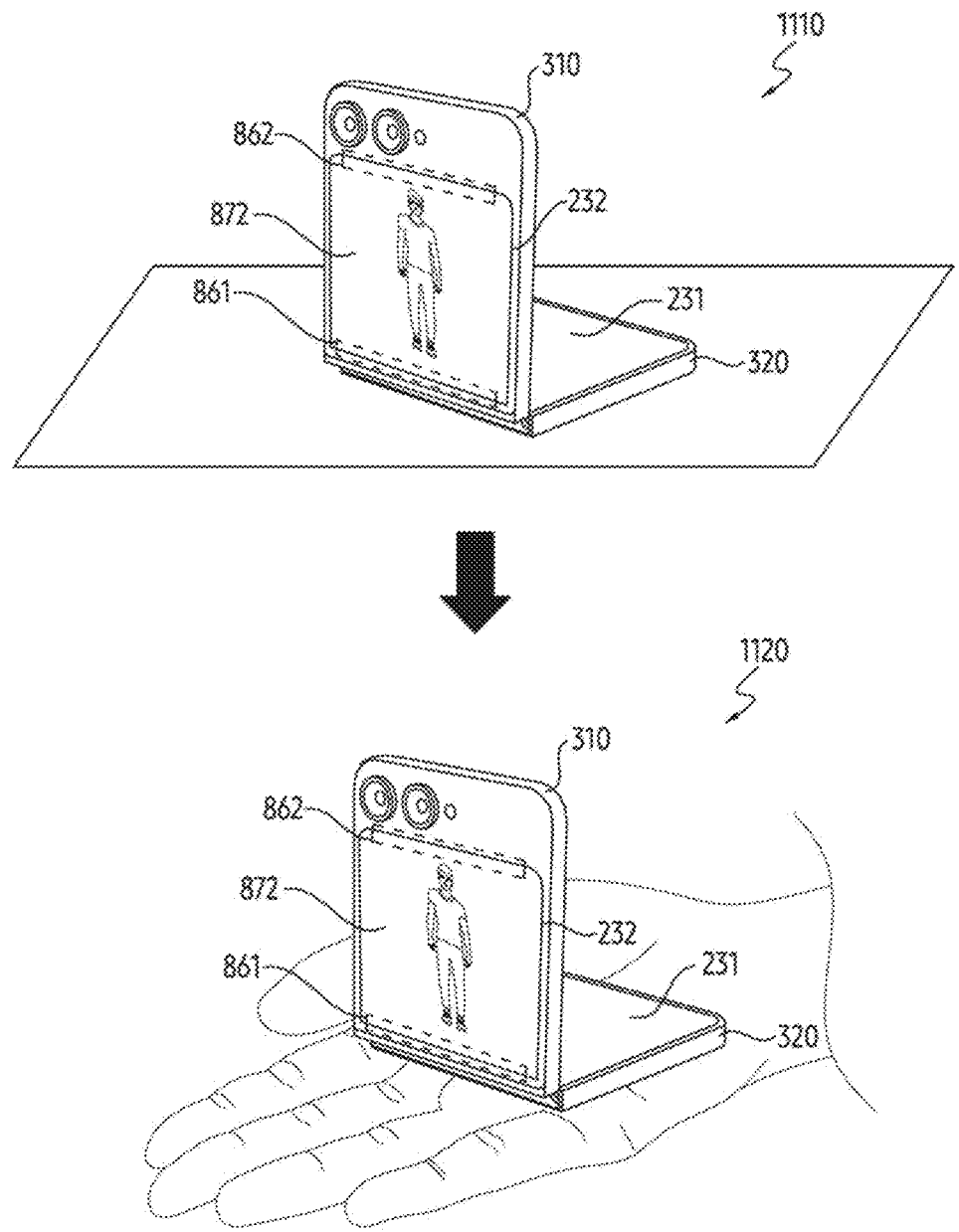
FIG. 11A illustrates an example of an operation of an electronic device according to an embodiment.

FIG. 11A illustrates an example of an operation of an electronic device according to an embodiment.

Figure 11B:
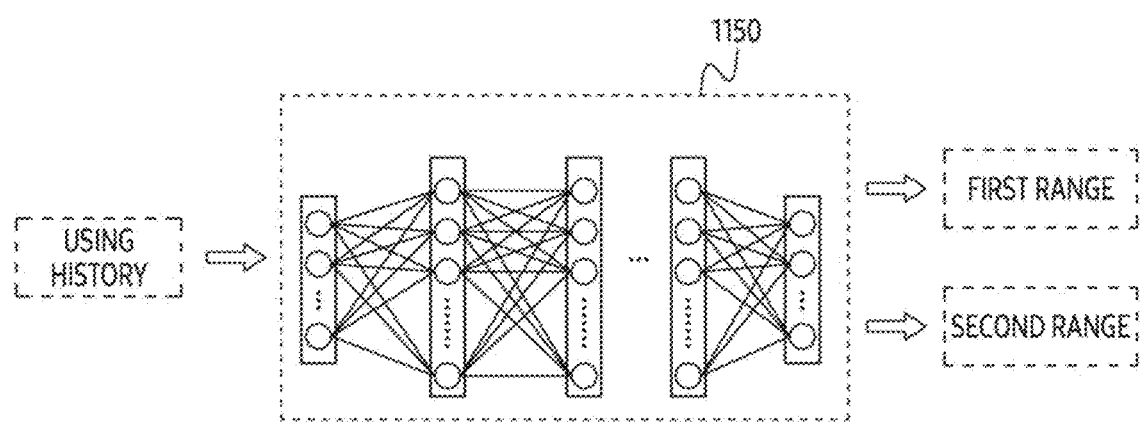
FIG. 11B illustrates an example of an operation of an electronic device for identifying a first range and a second range according to an embodiment.

FIG. 11B illustrates an example of an operation of an electronic device for identifying a first range and a second range according to an embodiment.

Referring to FIG. 11A, in state 1110, a processor 210 may identify that an electronic device 200 operates as a second mode (e.g., the second mode 602-2 of FIG. 6). For example, the processor 210 may identify that a state of the electronic device 200 is a second state. For example, the processor 210 may identify that an angle between a direction in which a first surface 311 faces and a direction in which a third surface 321 faces is within a designated range. The processor 210 may identify that first data, which is related to a posture of the electronic device 200 and is identified using a second inertial sensor 242-2, is within the first range.

According to an embodiment, the processor 210 may identify whether an angle between a surface (e.g., the fourth surface) of the second housing 320 and the ground is within a reference range, based on identifying that first data is within the first range. Based on that the angle between a surface of the second housing 320 and the ground is within the reference range, the second housing 320 (or the electronic device 200) may be identified as a flat state.

For example, the electronic device 200 may be placed on a surface parallel to the ground. For example, the second housing 320 of the electronic device 200 may be placed on a surface parallel to the ground. A surface (e.g., the fourth surface) of the second housing 320 may be parallel to the ground.

In state 1120, the electronic device 200 may be moved. For example, the electronic device 200 may be moved through a part (e.g., a hand) of the user's body. For example, when the electronic device 200 is moved, the processor 210 may identify whether the second data is within the second range. The processor 210 may identify whether the second data identified through the first inertial sensor 242-1 is within the second range in order to identify whether the display mode of the second display 232 is changed.

For example, while the electronic device 200 operates in the second mode 602-2, the first housing 310 may correspond to a surface perpendicular to the ground. The second display 232 disposed on the first housing 310 may also correspond to a surface perpendicular to the ground. Since the second display 232 corresponds to the surface perpendicular to the ground, the display mode identified through the second data may be changed even with a slight movement of the electronic device 200. Accordingly, the processor 210 may identify that the second range is wider than the first range for identifying the second housing 320 (or the electronic device 200) as being in a flat state. As an example, when the second range is set to be wider than the first range, the processor 210 may maintain the display mode of the second display 232 as the second mode while the second data is within the second range.

For example, as the second range is set to be wider than the first range, the display mode of the second display 232 may be changed only when the electronic device 200 is obviously rotated.

According to an embodiment, while the electronic device 200 is in the second state, one of the first display mode and the second display mode may be provided. For example, a screen in which a screen provided in the first display mode is rotated by 90 degrees may not be provided. When the electronic device 200 is moved in the second state, in order to prevent the display mode of the second display 232 from being repeatedly changed, a screen in which a screen provided in the first display mode is rotated by 90 degrees may not be provided.

Referring to FIG. 11B, the processor 210 may set the first range and the second range based on a using history of the electronic device 200. For example, at least one of using environment, using pattern, and/or using direction of the electronic device 200 may be different. Accordingly, the processor 210 may identify the first range and the second range, based on learning the using history of the electronic device 200.

According to an embodiment, the processor 210 may learn information on the using history of the electronic device 200 based on a model 1150. For example, the model 1150 may include a machine learning model. Learning of the machine learning model may include an operation of adjusting a weight between a plurality of nodes included in a neural network (e.g., feedforward neural network, convolution neural network (CNN), recurrent neural network (RNN), and/or long-short term memory model (LSTM)) based on supervised learning and/or unsupervised learning.

According to an embodiment, the processor 210 may identify at least one of the first range and/or the second range by using the model 1150 indicated by a plurality of parameters. For example, the processor 210 may identify the using history of the electronic device 200 as an input value of the model 1150. The processor 210 may identify the first range and/or the second range based on an output value of the model 1150. As an example, the first range may be set to identify whether the electronic device 200 operates in a tabletop mode. The first range may be a range for the first data identified through the second inertial sensor 242-2. The second range may be set to identify whether the display mode of the second display 232 is changed while the electronic device 200 operates in the tabletop mode. The second range may be a range for the second data identified through the first inertial sensor 242-1.

Figure 12:
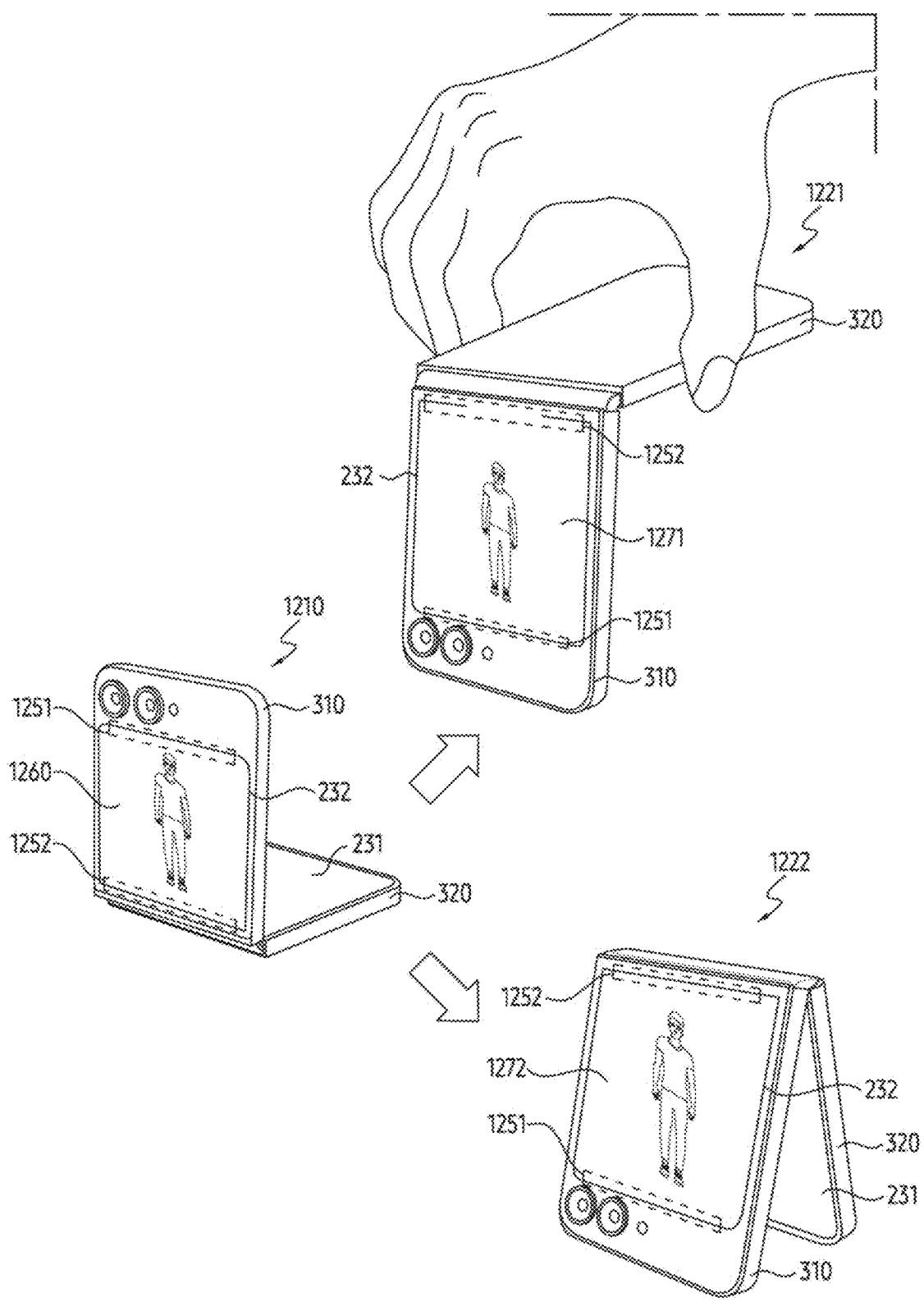
FIG. 12 illustrates an example of an operation of an electronic device according to an embodiment.

FIG. 12 illustrates an example of an operation of an electronic device according to an embodiment.

Referring to FIG. 12, in an example 1210, the electronic device 200 may operate in a tabletop mode. For example, the processor 210 may set a display mode of a second display 232 as a second display mode, based on the operations 810 to 830 of FIG. 8A. For example, the processor 210 may set a first corner 1251 (or a first area) of the second display 232 to an upper end of a screen displayed through the second display 232. The processor 210 may set a second corner 1252 (or a second area) of the second display 232 to a lower end of the screen displayed through the second display 232.

According to an embodiment, while a display mode of the second display 232 is a second display mode, the processor 210 may identify second data for a posture of the electronic device 200 using a first inertial sensor 242-1. The processor 210 may identify that the second data is out of a second range. Based on that the second data identifies the second range, the processor 210 may change the display mode of the second display 232 from the second display mode to the first display mode.

For example, the posture of the electronic device 200 may be changed from the example 1210 to an example 1221. The posture of the electronic device 200 may be inverted according to a user's grip direction with respect to the electronic device 200. The processor 210 may identify that the electronic device 200 is gripped. The processor 210 may identify whether the posture of the electronic device 200 is changed by the user's grip. The processor 210 may identify that the second data identified using the first inertial sensor 242-1 is out of the second range, based on that a posture of the electronic device 200 is flipped according to the user's grip direction. Based on identifying that the second data is out of the second range according to the user's grip direction, the processor 210 may change the display mode of the second display 232 from the second display mode to the first display mode. For example, the processor 210 may set the first corner 1251 (or the first area) of the second display 232 to a lower end of the screen displayed through the second display 232. The processor 210 may set the second corner 1252 (or the second area) of the second display 232 as an upper end of the screen displayed through the second display 232.

For example, the posture of the electronic device 200 may be changed from the example 1210 to an example 1222. The posture of the electronic device 200 may be changed to a posture in which the first display 231 (or the first display area 331 and the second display area 332) faces the ground. Based on that the posture of the electronic device 200 is changed to the posture in which the first display 231 (or the first display area 331 and the second display area 332) faces the ground, the processor 210 may identify that the second data identified using the first inertial sensor 242-1 is out of the second range. Based on identifying that the second data is out of the second range, the processor 210 may change the display mode of the second display 232 from the second display mode to the first display mode. For example, the processor 210 may set the first corner 1251 (or the first area) of the second display 232 to a lower end of the screen displayed through the second display 232. The processor 210 may set the second corner 1252 (or the second area) of the second display 232 to an upper end of the screen displayed through the second display 232.

Figure 13:
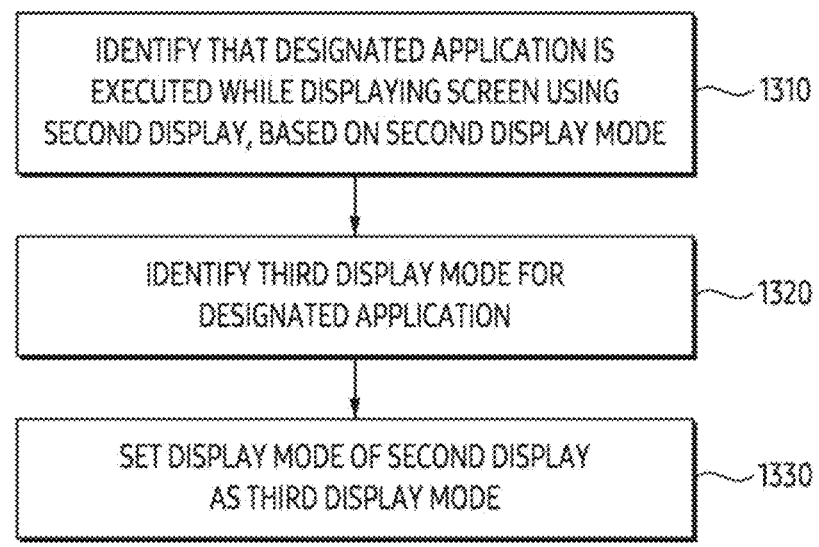
FIG. 13 is a flowchart illustrating an operation of an electronic device according to an embodiment.

FIG. 13 is a flowchart illustrating an operation of an electronic device according to an embodiment. In the following embodiment, each operation may be performed sequentially, but is not necessarily performed sequentially. For example, the sequence of each operation may be changed, and at least two operations may be performed in parallel.

Referring to FIG. 13, in operation 1310, the processor 210 may identify that a designated application is executed while displaying a screen using a second display 232 based on the second display mode. For example, the designated application may include an application executed while the electronic device 200 is in a tabletop mode.

For example, the designated application may include a form executed while the electronic device 200 is in the tabletop mode and a different form executed while the electronic device 200 is not in the tabletop mode. For example, the designated application may include an application for schedule notification. While the electronic device 200 is in the tabletop mode, the processor 210 may sequentially display notifications for a schedule to be performed according to time. While the electronic device 200 is not in the tabletop mode, the processor 210 may provide a notification only before the designated time from a start time of the schedule.

According to an embodiment, the processor 210 may set the electronic device 200 not to provide a notification while the electronic device 200 is in the tabletop mode. The processor 210 may operate as a focus mode within the tabletop mode. For example, while the electronic device 200 is in the tabletop mode, the processor 210 may identify the user's state, by using a camera (e.g., the camera 702 of FIG. 7) facing the user of the electronic device 200. The processor 210 may identify the user's concentration state by using the camera (e.g., the camera 702 of FIG. 7) facing the user of the electronic device 200. For example, the processor 210 may identify that the concentration state of the user is released. The processor 210 may provide information on the concentration state to the user based on identifying that the concentration state of the user is released.

According to an embodiment, a mode of the electronic device 200 set according to an application and/or a mode of the electronic device 200 capable of being set through the system may be configured to operate in conjunction with the electronic device 200 while the electronic device 200 is in the tabletop mode.

For example, the processor 210 may execute the designated application based on a user input. For example, in the third state or the fourth state, the processor 210 may display a screen for the designated application through the first display 231. The processor 210 may identify that a state of the electronic device 200 is changed from the third state or the fourth state to the second state. The processor 210 may identify that an angle between a direction in which the first surface 311 faces and a direction in which the third surface 321 faces is changed within the designated range. The processor 210 may display a screen for the designated application by using the second display 232.

In operation 1320, the processor 210 may identify the third display mode for the designated application. For example, the processor 210 may identify the third display mode for the designated application, based on the executed designated application. The display mode may be set according to the designated application. For example, the designated application may be set to be displayed in the third display mode. For example, the designated application may be set to be displayed in the portrait mode. For example, the designated application may be set to be displayed in the landscape mode. For example, the designated application may be set to be displayed in the reverse portrait mode.

In operation 1330, the processor 210 may set the display mode of the second display 232 as the third display mode. For example, the processor 210 may set the display mode of the second display 232 as the third display mode, based on identifying the third display mode.

According to an embodiment, the processor 210 may identify that the third display mode corresponds to the second display mode. Based on identifying that the third display mode corresponds to the second display mode, the processor 210 may set the display mode of the second display 232 as the third display mode corresponding to the second display mode. For example, the processor 210 may maintain the display mode of the electronic device 200, based on identifying that the third display mode corresponds to the second display mode. The processor 210 may not change the display mode of the electronic device 200, based on identifying that the third display mode corresponds to the second display mode.

According to an embodiment, the processor 210 may identify that the third display mode is different from the second display mode. Based on identifying that the third display mode is different from the second display mode, the processor 210 may change the display mode of the second display 232 from the second display mode to the third display mode.

According to an embodiment, regardless of a posture of the electronic device 200, the processor 210 may set the display mode of the electronic device 200 as the third display mode identified based on the designated application.

For example, the processor 210 may activate the first display 231 within one of the third state and the fourth state of the electronic device 200. While the first display 231 is activated, the processor 210 may set the display mode of the first display 231 as the third display mode, based on the executed designated application. The processor 210 may display a screen for the designated application, based on the display mode of the first display 231 set as the third display mode.

For example, the processor 210 may activate the second display 232 within one of the first state and the second state of the electronic device 200. While the second display 232 is activated, the processor 210 may set the display mode of the second display 232 as the third display mode, based on the executed designated application. The processor 210 may display a screen for the designated application, based on the display mode of the second display 232 set as the third display mode.

According to an embodiment, an electronic device (e.g., the electronic device 200) may comprise a first housing (e.g., the first housing 310) comprising a first surface and a second surface opposite to the first surface, a second housing (e.g., the second housing 320) comprising a third surface and a fourth surface opposite to the third surface, a hinge foldably or rotatably connecting the first housing to the second housing along a folding axis, a first display (e.g., the first display 231) disposed on the first surface and the third surface, a second display (e.g., the second display 232) disposed on the second surface, a first inertial sensor (e.g., the first inertial sensor 242-1) disposed in the first housing, a second inertial sensor (e.g., the second inertial sensor 242-2) disposed in the second housing, and at least one processor (e.g., the processor 210) operably coupled to the first display, the second display, the first inertial sensor, and the second inertial sensor. The at least one processor may be configured to identify, using the first inertial sensor and the second inertial sensor, that an angle between a first direction in which the first surface faces and a second direction in which the third surface faces is within a designated range. The at least one processor may be configured to identify that first data, which is related to a posture of the electronic device and is identified using the second inertial sensor, is within a first range, based on identifying that the angle between the first direction in which the first surface faces and the second direction in which the third surface faces is within the designated range. The at least one processor may be configured to change a display mode of the second display, based on the identified first data that is within the first range.

According to an embodiment, the at least one processor may be configured to, based on the identified first data that is within the first range, change the display mode of the second display from a first display mode for displaying a first screen to a second display mode for displaying a second screen in which the first screen is rotated.

According to an embodiment, the at least one processor may be configured to, based on the changed display mode, identify second data, which is related to a posture of the electronic device and is identified using the first inertial sensor, is out of a second range different from the first range. The at least one processor may be configured to change the display mode of the second display from the second display mode to the first display mode, based on identifying that the second data is out of the second range.

According to an embodiment, the at least one processor may be configured to identify that a designated application is executed while displaying a screen using the second display based on the second display mode. The at least one processor may be configured to identify a third display mode for the designated application, based on the executed designated application. The at least one processor may be configured to set the display mode of the second display to the third display mode, based on identifying the third display mode.

According to an embodiment, the at least one processor may be configured to set the display mode of the second display to the third display mode corresponding to the second display mode, based on identifying that the third display mode corresponds to the second display mode. The at least one processor may be configured to change the display mode of the second display from the second display mode to the third display mode, based on identifying that the third display mode is different from the second display mode.

According to an embodiment, the at least one processor may be configured to, while the first data is within the first range, based on identifying that the angle between the first direction in which the first surface faces and the second direction in which the third surface faces is out of the designated range, set the display mode of the second display to the first display mode.

According to an embodiment, the at least one processor may be configured to identify that the angle between the first direction in which the first surface faces and the second direction in which the third surface faces is changed within the designated range. The at least one processor may be configured to deactivate the first display and activate the second display, based on identifying that the angle between the first direction in which the first surface faces and the second direction in which the third surface faces is changed within the designated range.

According to an embodiment, the at least one processor may be configured to identify that the first data, which is identified using the first inertial sensor, is within the first range when the direction in which the third surface faces is opposite to a gravity direction.

According to an embodiment, the at least one processor may be configured to set usage history information of the electronic device as an input value of a designated model indicated by a plurality of parameters. The at least one processor may be configured to identify the first range, based on an output value of the designated model.

According to an embodiment, the first data may comprise first acceleration data and first rotation data. The second data may comprise second acceleration data and second rotation data.

According to an embodiment, the at least one processor may be configured to identify, using the first data and the second data, the angle between the first direction in which the first surface faces and the second direction in which the third surface faces, based on identifying that a screen is displayed through at least one of the first display and the second display. The at least one processor may be configured to identify, using the first acceleration data and the second acceleration data, the angle between the first direction in which the first surface faces and the second direction in which the third surface faces, based on identifying that a screen is not displayed through the first display and the second display.

According to an embodiment, a method of an electronic device (e.g., the electronic device 200) may comprise identifying, using a first inertial sensor (e.g., the first inertial sensor 242-1) of the electronic device and a second inertial sensor (e.g., the second inertial sensor 242-2) of the electronic device, that an angle between a first direction in which a first surface of a first housing (e.g., the first housing 310), which includes the first surface and a second surface opposite to the first surface, faces and a second direction in which a third surface of a second housing (e.g., the second housing 320), which includes the third surface and a fourth surface opposite to the third surface, faces is within a designated range. The method may comprise, based on identifying that the angle between the first direction in which the first surface faces and the second direction in which the third surface faces is within the designated range, identifying that first data, which is related to a posture of the electronic device and is identified using the second inertial sensor, is within a first range. The method may comprise, based on the identified first data that is within the first range, changing a display mode of a second display (e.g., the second display 232) of the electronic device.

According to an embodiment, the method may comprise, based on the identified first data is within the first range, changing the display mode of the second display from a first display mode for displaying a first screen to a second display mode for displaying a second screen in which the first screen is rotated.

According to an embodiment, based on the changed display mode, identifying second data, which is related to a posture of the electronic device and is identified using the first inertial sensor, is out of a second range different from the first range. The method may comprise, based on identifying that the second data is out of the second range, changing the display mode of the second display from the second display mode to the first display mode.

According to an embodiment, the method may comprise identifying that a designated application is executed while displaying a screen using the second display based on the second display mode. The method may comprise, based on the executed designated application, identifying a third display mode for the designated application. The method may comprise, based on identifying the third display mode, setting the display mode of the second display to the third display mode.

According to an embodiment, the method may comprise, based on identifying that the third display mode corresponds to the second display mode, setting the display mode of the second display to the third display mode corresponding to the second display mode. The method may comprise, based on identifying that the third display mode is different from the second display mode, changing the display mode of the second display from the second display mode to the third display mode.

According to an embodiment, the method may comprise, while the first data is within the first range, based on identifying that the angle between the first direction in which the first surface faces and the second direction in which the third surface faces is out of the designated range, setting the display mode of the second display to the first display mode.

According to an embodiment, the method may comprise identifying that the angle between the first direction in which the first surface faces and the second direction in which the third surface faces is changed within the designated range. The method may comprise, based on identifying that the angle between the first direction in which the first surface faces and the second direction in which the third surface faces is changed within the designated range, deactivating the first display and activating the second display.

According to an embodiment, the method may comprise identifying that the first data, which is identified using the first inertial sensor, is within the first range when the direction in which the third surface faces is opposite to a gravity direction.

According to an embodiment, the method may comprise setting usage history information of the electronic device as an input value of a designated model indicated by a plurality of parameters. The method may comprise, based on an output value of the designated model, identifying the first range.

According to an embodiment, a non-transitory computer readable storage medium may store one or more programs. The one or more programs may comprise instructions, when being executed by at least one processor of an electronic device with a first housing (e.g., the first housing 310) comprising a first surface and a second surface opposite to the first surface, a second housing (e.g., the second housing 320) comprising a third surface and a fourth surface opposite to the third surface, a first display (e.g., the first display 231), a second display (e.g., the second display 232), a first inertial sensor (e.g., the first inertial sensor 242-1), and a second inertial sensor (e.g., the second inertial sensor 242-2), cause the electronic device to identify, using the first inertial sensor and the second inertial sensor, that an angle between a first direction in which the first surface faces and a second direction in which the third surface faces is within a designated range. The one or more programs may comprise instructions, when being executed by the at least one processor, cause the electronic device to, based on identifying that the angle between the first direction in which the first surface faces and the second direction in which the third surface faces is within the designated range, identify that first data, which is related to a posture of the electronic device and is identified using the second inertial sensor, is within a first range. The one or more programs may comprise instructions, when being executed by the at least one processor, cause the electronic device to, based on the identified first data that is within the first range, change a display mode of the second display.

The above-described electronic device (e.g., electronic device 200) may be a foldable device. The electronic device may be folded and used on a desk or on the ground. In this case, a display disposed in an area opposite to the folding area of the electronic device may be used. As the electronic device is used while mounted on a desk or on the ground, the screen displayed on the display may be rotated. The electronic device may identify the posture of the electronic device using a plurality of inertial sensors and rotate the screen displayed on a display placed outside the electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a housing including a first housing part and a second housing part rotatably coupled with the first housing part;
a first display defining at least a portion of a front side of the housing;

a second display defining at least a portion of a rear side of the first housing part;
at least one sensor disposed in the housing; and
at least one processor comprising processing circuitry; and
memory comprising one or more storage media, storing instructions,
wherein the instructions, when executed by the at least one processor, cause the electronic device to:
while the housing is in a second folded state in which the first housing part and the second housing part are partially folded with respect to each other, obtain data using the at least one sensor;
based on the data being out of a threshold range, display, on the second display, a screen in a first orientation; and
based on the data being within the threshold range, display, on the second display, the screen in a second orientation opposite to the first orientation.

2. The electronic device of claim 1, wherein the instructions, when executed by the at least one processor, cause the electronic device to, based on identifying that the data is changed from being out of the threshold range to being within the threshold range, change a display mode of the second display, from a first display mode for displaying the screen in the first orientation, to a second display mode for displaying the screen in the second orientation.

3. The electronic device of claim 2, wherein the instructions, when executed by the at least one processor, cause the electronic device to:
while the display mode of the second display is set as the second display mode, identify that the data is out of a second range different from the threshold range, and
based on identifying that the data is out of the second range, change the display mode of the second display from the second display mode to the first display mode.

4. The electronic device of claim 2, wherein the instructions, when executed by the at least one processor, cause the electronic device to:
identify that a designated application is executed while displaying a screen using the second display based on the second display mode,
based on identifying that the designated application is executed, identify a third display mode for the designated application, and
based on identifying the third display mode, set the display mode of the second display to the third display mode.

5. The electronic device of claim 4, wherein the instructions, when executed by the at least one processor, cause the electronic device to:
based on identifying that the third display mode corresponds to the second display mode, set the display mode of the second display to the third display mode corresponding to the second display mode, and
based on identifying that the third display mode is different from the second display mode, change the display mode of the second display from the second display mode to the third display mode.

6. The electronic device of claim 2, wherein the instructions, when executed by the at least one processor, cause the electronic device to:
while the data is within the threshold range, based on identifying that an angle between the first housing part and the second housing part is out of a designated range, set the display mode of the second display to the first display mode.

7. The electronic device of claim 1, wherein the instructions, when executed by the at least one processor, cause the electronic device to:
identify that an angle between the first housing part and the second housing part is changed within a designated range, and
based on identifying that the angle between the first housing part and the second housing part is changed within the designated range, deactivate the first display and activate the second display.

8. The electronic device of claim 1, wherein the instructions, when executed by the at least one processor, cause the electronic device to identify that the data is within the threshold range while a direction of a front side of the second housing part is opposite to a gravity direction.

9. The electronic device of claim 1, wherein the instructions, when executed by the at least one processor, cause the electronic device to:
set usage history information of the electronic device as an input value of a designated model indicated by a plurality of parameters, and
based on an output value of the designated model, identify the threshold range.

10. The electronic device claim 1, wherein the at least one sensor comprises:
a first sensor disposed in the first housing part, configured to obtain data used for identifying an orientation of the first housing part, and
a second sensor disposed in the second housing part, configured to obtain data used for identifying an orientation of the second housing part.

11. A method of a foldable electronic device comprising a housing comprising a first housing part and a second housing part rotatably coupled with the first housing part, a first display defining at least a portion of a front side of the housing, a second display defining at least a portion of a rear side of the first housing part, and at least one sensor disposed in the housing, the method comprising:
identifying, via the at least one sensor, a state of the foldable electronic device, wherein the state of the foldable electronic device comprises:
an unfolded state of the foldable electronic device in which the first and second housing parts are unfolded with respect to each other,
a first folded state of the foldable electronic device in which the first and second housing parts are fully folded with respect to each other, and
a second folded state of the foldable electronic device in which the first and second housing parts are partially folded with respect to each other:
based on the first folded state being identified via the at least one sensor, deactivate a function of the foldable electronic device that adjusts an orientation of a screen displayed via the second display in accordance with an orientation of the housing being changed; and
based on the second folded state being identified via the at least one sensor, activate the function of the foldable electronic device.

12. The method of claim 11, comprising,
while the function of the foldable electronic device is activated in the second folded state:
based on the orientation of the first housing part being a first orientation, displaying a first screen, and
based on the orientation of the first housing part being a second orientation, displaying a second screen which is rotated 180 degrees from the first screen.

13. The method of claim 12, wherein the function of the foldable electronic device is set to allow the screen to rotate 180 degrees.

14. The method of claim 11, wherein the foldable electronic device comprises a camera disposed in the rear side of the first housing part,
wherein the method further comprises:
while the function of the foldable electronic device is deactivated in the first folded state, displaying a first screen including a preview image obtained by the camera, and
based on the state of the foldable electronic device being changed from the first folded state to the second folded state:
activating the function of the foldable electronic device, and
based on the function of the foldable electronic device being activated, displaying a second screen rotated from the screen while an orientation of the preview image is maintained.

15. The method of claim 11, wherein the at least one sensor comprises:
a first sensor disposed in the first housing part, configured to obtain data used for identifying an orientation of the first housing part, and
a second sensor disposed in the second housing part, configured to obtain data used for identifying an orientation of the second housing part.

16. A foldable electronic device comprising:
a housing including a first housing part and a second housing part rotatably coupled with the first housing part;
a first display defining at least a portion of a front side of the housing;
a second display defining at least a portion of a rear side of the first housing part;
at least one sensor disposed in the housing;
at least one processor comprising processing circuitry; and
memory comprising one or more storage media, storing instructions,
wherein the instructions, when executed by the at least one processor, cause the foldable electronic device to:
identify, via the at least one sensor, a state of the foldable electronic device, wherein the state of the foldable electronic device comprises:
an unfolded state of the foldable electronic device in which the first and second housing parts are unfolded with respect to each other,
a first folded state of the foldable electronic device in which the first and second housing parts are fully folded with respect to each other, and
a second folded state of the foldable electronic device in which the first and second housing parts are partially folded with respect to each other;
based on the first folded state being identified via the at least one sensor, deactivate a function of the foldable electronic device that adjusts an orientation of a screen displayed via the second display in accordance with an orientation of the housing being changed; and
based on the second folded state being identified via the at least one sensor, activate the function of the foldable electronic device.

17. The foldable electronic device of claim 16, wherein the instructions, when executed by the at least one processor, cause the foldable electronic device to:
while the function of the foldable electronic device is activated in the second folded state:
based on the orientation of the first housing part being a first orientation, display a first screen, and
based on the orientation of the first housing part being a second orientation, display a second screen which is rotated 180 degrees from the first screen.

18. The foldable electronic device of claim 17, wherein the function of the foldable electronic device is set to allow the screen to rotate 180 degrees.

19. The foldable electronic device of claim 16, wherein the foldable electronic device comprises a camera disposed in the rear side of the first housing part,
wherein the instructions, when executed by the at least one processor, cause the foldable electronic device to:
while the function of the foldable electronic device is deactivated in the first folded state, display a first screen including a preview image obtained by the camera, and
based on the state of the foldable electronic device being changed from the first folded state to the second folded state:
activate the function of the foldable electronic device, and
based on the function of the foldable electronic device being activated, display a second screen rotated from the screen while an orientation of the preview image is maintained.

20. The foldable electronic device of claim 16, wherein the at least one sensor comprises:
a first sensor disposed in the first housing part, configured to obtain data used for identifying an orientation of the first housing part, and
a second sensor disposed in the second housing part is configured to obtain data used for identifying an orientation of the second housing part.

* * * * *